United States Patent
Cat et al.

(10) Patent No.: US 12,190,304 B2
(45) Date of Patent: Jan. 7, 2025

(54) EMBEDDED CARD READER SECURITY

(71) Applicant: Block, Inc., Oakland, CA (US)

(72) Inventors: Murat Cat, Vaughan (CA); Murtaza Munaim, Fremont, CA (US); Gokhan Aydeniz, Mississauga (CA); Conrad Rushing, Brooklyn, NY (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/210,895

(22) Filed: Jun. 16, 2023

(65) Prior Publication Data

US 2023/0410076 A1    Dec. 21, 2023

Related U.S. Application Data

(63) Continuation of application No. 17/183,149, filed on Feb. 23, 2021, now Pat. No. 11,694,178.

(51) Int. Cl.
*G06Q 20/20* (2012.01)
*G06Q 20/40* (2012.01)

(52) U.S. Cl.
CPC ....... *G06Q 20/206* (2013.01); *G06Q 20/4012* (2013.01)

(58) Field of Classification Search
CPC .................. G06Q 20/206; G06Q 20/4012
See application file for complete search history.

(56) References Cited

U.S. PATENT DOCUMENTS

| | | |
|---|---|---|
| 2003/0061170 A1 | 3/2003 | Uzo et al. |
| 2003/0173401 A1 | 9/2003 | Yamagami |
| 2004/0203384 A1 | 10/2004 | Sugikawa et al. |
| 2006/0111081 A1 | 5/2006 | Whittington et al. |

(Continued)

FOREIGN PATENT DOCUMENTS

| | | |
|---|---|---|
| EP | 1553518 A1 | 7/2005 |
| GB | 2508015 A | 5/2014 |

(Continued)

OTHER PUBLICATIONS

Ahmad et al., "Enhancing the Security of Mobile Applications by Using TEE and (U)SIM", 2013 IEEE 10th International Conference on Ubiquitous Intelligence and Computing and 2013 Ieee 10th International Conference on Autonomic and Trusted Computing, Dec. 1, 2013, pp. 575-582.

Ahmad et al., "Enhancing the Security of Mobile Applications by Using TEE and (U)SIM", 2013 IEEE 10th International Conference on Ubiquitous Intelligence and Computing and 2013 IEEE 10th International Conference on Autonomic and Trusted Computing, Year 2013, DOI: 10.1109/UIC-ATC.2013.76, pp. 575-582.

(Continued)

*Primary Examiner* — A. Hunter Wilder
*Assistant Examiner* — Joseph M Mutschler
(74) *Attorney, Agent, or Firm* — Lee & Hayes, P.C.

(57) ABSTRACT

Systems, devices, and methods for embedded card reader security include configuring a personal account number (PAN) application installed on a device to utilize an embedded card reader (ECR) and receiving, at the PAN application and based at least in part on an interaction between the ECR and the device, a PAN for a transaction. The PAN may be sent to a payment processing service and a personal identification number (PIN) application may render a PIN user interface. The PIN may be received at the PIN application and sent to the payment processing service. The transaction may be completed based at least in part on an indication from the payment processing service that the PAN and the PIN have been accepted.

20 Claims, 17 Drawing Sheets

(56) References Cited

U.S. PATENT DOCUMENTS

| | | |
|---|---|---|
| 2008/0040274 A1 | 2/2008 | Uzo et al. |
| 2008/0189214 A1 | 8/2008 | Mueller et al. |
| 2008/0294766 A1 | 11/2008 | Wang et al. |
| 2010/0049655 A1 | 2/2010 | Nilsson et al. |
| 2011/0246315 A1 | 10/2011 | Spies et al. |
| 2012/0185398 A1 | 7/2012 | Weis et al. |
| 2013/0144792 A1* | 6/2013 | Nilsson ................ G07F 7/1091 705/67 |
| 2014/0114855 A1 | 4/2014 | Bajaj et al. |
| 2020/0160347 A1 | 5/2020 | Quiroga et al. |
| 2020/0242588 A1 | 7/2020 | Rule et al. |
| 2022/0270064 A1 | 8/2022 | Cat et al. |
| 2022/0270069 A1 | 8/2022 | Cat et al. |

FOREIGN PATENT DOCUMENTS

| | | |
|---|---|---|
| JP | 2002-163450 A | 6/2002 |
| JP | 2015-114737 A | 6/2015 |
| JP | 2016-133832 A | 7/2016 |
| JP | 2018-125876 A | 8/2018 |
| WO | 2008/144555 A1 | 11/2008 |
| WO | 2018/126283 A1 | 7/2018 |
| WO | 2020/214113 A1 | 10/2020 |
| WO | 2022/182639 A1 | 9/2022 |

\* cited by examiner

EMBEDDED CARD READER SECURITY

RELATED APPLICATIONS

This application claims priority to and is a continuation of U.S. patent application Ser. No. 17/183,149, filed on Feb. 23, 2021, the entire contents of which are incorporated herein by reference.

TECHNICAL FIELD

Payment instruments are utilized to purchase products. In some examples, readers are incorporated into a point of sale device associated with a payment processing service. In other examples, readers are separate from such point of sale devices. In still other examples, embedded card readers may be configured to operate on personal devices, such as cellphones, tablets, etc. In these and other examples, security of information obtained by readers and/or other information associated with transactions is desirable.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1A:
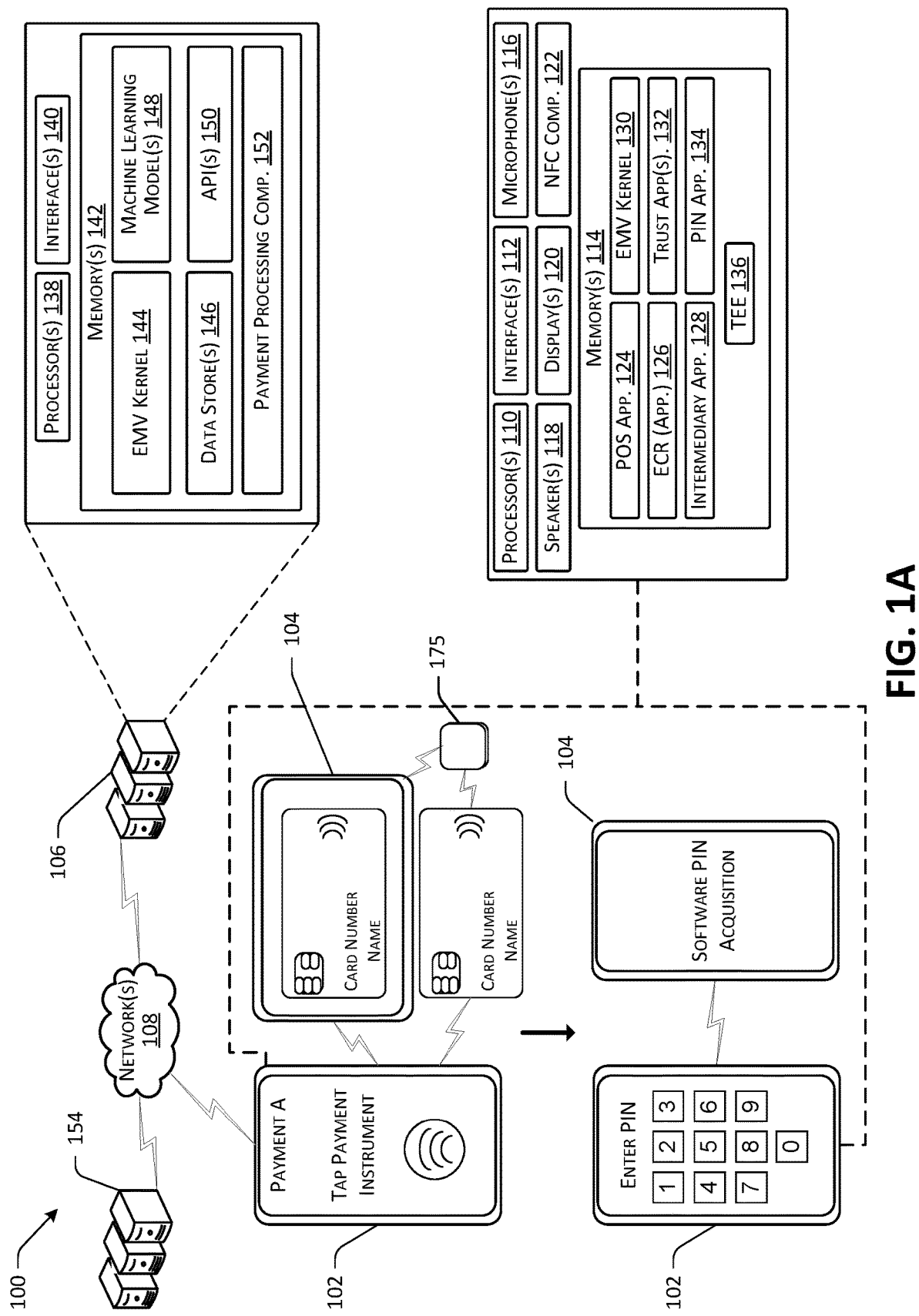
FIG. 1A illustrates an example environment for embedded card reader (ECR) security.

Techniques described herein are directed to, among other things, embedded card reader (ECR) security.

By way of example, the techniques described herein allow for PIN data entry and PAN collection by a device without spatial or temporal separation, and also allow for PAN data and PIN data separation achieved via two-phase server messaging. Upon receiving a PIN entry request, a POS application may return a default PIN without showing the PIN entry dialog to a buyer so that the payment kernels can proceed to creating a PIN outcome. The PIN outcome, without the actual PIN, may be stored in association with a payment processing service and then the PIN may be collected by the POS application and sent to the service. At the payment processing service, tender requests may be stored and, upon receiving the actual account PIN, may replace the default PIN. The payment processing service may then send an authorization request to an issuer of the payment instrument utilized for the transaction. In addition to this temporal separation, spatial separation may also be introduced in the form of isolated process services. Examples of this may include utilizing separate applications for handling PAN data and PIN data, introducing intermediary applications, utilizing trusted execution environments, and/or utilizing encryption schemes that allow for PAN data processing to occur at the payment processing service and/or a vendor datacenter that is separate from the payment processing service.

Some merchants do not utilize specific POS devices to handle transactions, instead opting for utilizing consumer off-the-shelf (COTS) device to perform transactions. Example COTS devices include a typical mobile device, such as cellphone, a tablet, etc. These devices may be utilized to install one or more applications that allow the COTS devices to be utilized for acquiring PAN data and/or other information for satisfying a payment. To do so, a near-field communication (NFC) component of a COTS device may be utilized by one or more applications on the device to read PAN data from a payment instrument, and the applications may utilize that PAN data to complete a transaction. Such techniques can be described as ECR techniques. In certain examples, COTS devices and other devices may, in addition to acquiring PAN data, may be configured to acquire PIN data to authorize a transaction.

Techniques for acquiring PIN data include "PIN-on-glass" techniques where a PIN pad or other user interface is displayed on a merchant device configured to receive user input represent a PIN. Corresponding PIN data is generated on the merchant device and utilized for comparison with reference PIN data associated with the given payment instrument for completing a payment. Additionally, the techniques for acquiring PIN data include SPoC, where a secure reader PIN, a PIN application, the merchant device, as well as backend monitoring and attestation systems are utilized to acquire PIN data. It should be understood that when a "card reader" and/or "reader" is described herein, those terms encompass components configured to acquire data from a payment instrument, which may be a physical card and/or may be another device and/or object that is not a card. As such, anywhere where a "card" is described as being utilized by way of example, generally any payment instrument may be utilized.

Even in these examples where PIN data is utilized for a payment, the use of COTS devices, or otherwise devices that have not been specifically configured as POS devices with typical security mechanisms put in place, represent an increased risk of unauthorized exposure of PAN data and/or PIN data by a nefarious actor. For example, if a nefarious actor has gained access to a given COTS device, the presence of both PAN data and PIN data on the COTS device at the same time and/or with respect to the same application increases the risk that the nefarious actor can acquire both pieces of information to be utilized in a fraudulent transaction at a later time. As such, in addition to techniques for collecting unseparated PAN data and PIN data, the present disclosure also describes, among other things, techniques for ensuring temporal and/or spatial separation of PAN data and PIN data as utilized by a COTS device for completing a payment associated with a transaction.

For example, the COTS device may include one or more components for ensuring temporal and/or spatial separation of PAN data and PIN data on the COTS device. In some examples, the ECR may be embedded into a card reader library of a POS application and in these examples the ECR may communicate directly with the POS application and the NFC component of the COTS device. In this example, the ECR may be utilized to acquire the PAN data from the payment instrument and to provide the PAN data to the POS application. The POS application may then be configured to associate a default PIN with the PAN data and send a tender request to a payment processing service with the PAN data and the default PIN. Once the PAN data and the default PIN are sent to the payment processing service, the POS application may be configured to delete or otherwise remove the PAN data from the COTS device prior to requesting the account PIN from the buyer. By so doing, the PAN data and the PIN data for the account PIN are not present on the COTS device at the same time. This temporal separation of PAN data and PIN data may hinder a nefarious actor from acquiring both pieces of information needed to utilize a payment instrument to make a payment. Once the PAN data is removed, a PIN entry dialog may be displayed to the buyer, and the buyer may provide user input representing the account PIN, the PIN data may be sent to the payment processing service, which may then send an authorization request for the payment to an issuer of the payment instrument. By utilizing the process described above, payment instrument security is increased in a computer-centric way that is performed on-the-fly and in a time sensitive way.

In other examples, the ECR may be separated from the POS application and/or the card reader library and the ECR may be utilized as an isolated service. In these examples, there may be an intermediary application between the ECR and the POS application, and the card reader library may be standalone, integrated into the POS application, or integrated into the intermediary application. This spatial separation of the ECR and the POS application may provide for a smaller attack surface for payment kernels and ensures that the ECR runs outside the POS application, which may be the most likely point of attack by a nefarious actor. In these examples, multiple trust applications may be utilized to determine whether the COTS device is still a trusted device at the time of a payment. In still other examples, the ECR may be deployed to the COTS device as a separate application utilizing the card reader library as a separated application. In these examples, the ECR may be responsible for performing the default PIN addition processes. In still other examples, data encryption may be utilized at the COTS device such that decryption of at least the PAN data, and the PIN data in some examples, is performed away from the COTS device. In this example, the POS application may receive the encrypted data from the NFC component, and the POS application may send the encrypted data to the payment processing service. The payment processing service may manage the keys and/or other decryption mechanisms and may decrypt the encrypted data to identify the PAN data and/or the PIN data. In other examples, instead of the encrypted data being sent to the POS application, the encrypted data is sent to a vendor datacenter, which may be operated by an original equipment manufacturer (OEM) of the device. The OEM may have the keys and/or other decryption mechanisms to decrypt the encrypted data and identify the PAN data and/or the PIN data. In still other examples, a TEE may be utilized to enhance ECR security on the COTS device.

By performing one or more of the techniques described herein, spatial and/or temporal separation of PAN data from other data utilized for a transaction, such as PIN data, promotes security of the transaction and makes unauthorized access to all information needed to nefariously utilize the payment instrument difficult to obtain. These techniques are specific to the computer-centric problem of handling digital transactions on COTS devices where such devices may be compromised and unauthorized access may occur. These techniques are also specific to computer-centric solutions that utilize specifically-configured applications, application arrangements, encryption/decryption schemes, TEEs, and other components that could not be performed by a human being, whether as a mental process or through physical means. This added security is also implemented in a time-sensitive manner between when a transaction is initiated and when that transaction is completed (i.e., a matter of seconds), minimizing latency in the payment process.

In at least one example, operations performed by the payment processing service can leverage a multi-party merchant ecosystem. That is, in some examples, a payment processing service (e.g., server(s) associated therewith) can communicate with end users (e.g., customers and/or merchants) via respective user computing devices, and over one or more networks. Such a remote, network-connected multi-party merchant ecosystem can enable the payment processing service to access data associated with multiple, different merchants and/or customers, and use such data for improving ECR security, in some examples, in real time or near-real time. Having a payment processing service, which may have access to multiple disparate merchants and multiple disparate platforms, perform the processes associated with those described herein allows for the unique generation and use of merchant-related data to increase ECR security with respect to any given merchant.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1A illustrates an example environment for embedded card reader security. In FIG. 1A, server(s) 106 can be associated with a payment processing service, which can communicate with user computing devices, such as a merchant device 102 (also described herein as a merchant device and/or a merchant system) and buyer devices 104, via network(s) 108. That is, the merchant device 102 and the buyer devices 104 are network-connected devices that enable end users to access services provided by the payment processing service (e.g., via the server(s) 106). Additional details associated with the server(s) 106, the user computing devices (e.g., 102, 104), and the network(s) 108 are described below with reference to FIGS. 15 and 16.

In at least one example, the server(s) 104 can include a payment processing component 152. The payment processing component 152 can, among other things, process transactions. That is, in at least one example, the payment processing component 152 can access payment data associated with a user, send a request for authorization of the payment data to a payment processing service, and process a transaction based on a response from the payment processing service. In other examples, the payment processing component 152 can access an account maintained by the payment processing service and can use funds associated with the account to process a transaction.

In at least one example, the payment processing service can expose functionality and/or services via one or more APIs 150, thereby enabling functionality and/or services described herein to be integrated into various functional components of the environment 100. The API(s) 150, which can be associated with the server(s) 106, can expose functionality described herein and/or avail payment processing services to various functional components associated with the environment 100. At least one of the API(s) 150 can be a private API, thereby availing services and/or functionalities to functional components (e.g., applications, etc.) that are developed internally (e.g., by developers associated with the payment processing service). At least one of the API(s) 150 can be an open or public API, which is a publicly available API that provides third-party developers (e.g., OEMs described herein) with programmatic access to a proprietary software application or web service of the payment processing service provider. That is, the open or public API(s) can enable functionality and/or services of the payment processing service to be integrated into other platforms. The API(s) 150 can include sets of requirements that govern how applications, or other functional components, can interact with one another.

In some examples, the payment processing service can provide third-party entities with a software developer kit ("SDK") that may utilize functionality exposed by the API(s) 150. The SDK can include software development tools that allow a third-party developer (i.e., a developer that is separate from the payment processing service) to include functionality and/or avail services as descried herein. The SDK and/or the API(s) 150 may include one or more libraries, programming code, executables, other utilities, and documentation that allows a developer to directly include functionality and/or avail services described herein within an application as described herein.

In at least one example, the server(s) 106 can include, or otherwise have access to, data store(s) 146. The data store(s) 146 can store, among other types of data, merchant data, user profiles and payment records. For instance, a user profile of the buyer can store payment data associated with payment instrument(s) of the buyer. In some examples, an account maintained by the payment processing service on behalf of the buyer can be mapped to, or otherwise associated with, the user profile of the buyer. Such an account can store funds received from peer-to-peer payment transactions, deposits from employers, transfers from other accounts of the buyer, and so on. Additionally or alternatively, a user profile of the merchant can be mapped to, or otherwise associated with, an account of the merchant (which can be maintained by the payment processing service, a bank, or another payment service). Additional details are provided below.

As illustrated in FIG. 1A, the merchant device 102 is associated with user interface(s) that enable the buyer to interact with the merchant device 102. The user interface(s) can be presented via web browsers, applications (e.g., desktop or otherwise dedicated, provided by the payment processing provider, provided by a third-party, etc.), or the like to enable the buyer to access functionality and/or services as described herein. Similarly, buyer device 104 can be associated with user interface(s) which can be presented via web browsers, applications (e.g., desktop or otherwise dedicated, provided by the payment processing service, provided by a third-party, etc.), or the like to enable the buyer to interact with the buyer device 104 and access functionality and/or services as described herein.

As illustrated above, the environment 100 may include the merchant device 102, the server(s) 106, and/or the buyer device 104. The merchant device 102, in addition to the components discussed above, may include one or more components such as one or more processors 110, one or more network interfaces 112, memory 114, one or more microphones 116, one or more speakers 118, one or more displays 120, and/or a NFC component 122. The microphones 116 may be configured to receive audio from the environment 100 may generate corresponding audio data, which may be utilized as discussed herein. The speakers 118 may be configured to output audio. The displays 120 may be configured to present images (which may be described as video). The NFC component 122 may be utilized to wirelessly acquire data from a NFC-enabled payment instrument. The memory 114 may include one or more components such as a POS application 124, an ECR application 126, an intermediary application 128, an EMV kernel 130, one or more trust applications 132, a PIN application 134, and/or a TEE 136. These components will be described in detail below. It should be noted that the merchant device 102, like the other devices and systems described herein, may take one or more forms, such as a computing device, a laptop computer, a phone, and/or components thereof, for example.

In examples, a reader device 175 can be coupled to the merchant device 102 via a wired or wireless connection, such as via a Bluetooth®, BLE, and so on. Additional details are described below with reference to FIGS. 15 and 16. In some examples, the reader device 175 can read information from payment instruments. In some examples, the reader device 175 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). In some examples, POS devices and reader devices can be configured in one-to-one pairings. In other examples, the POS devices and reader devices can be configured in many-to-one pairings (e.g., one POS device coupled to multiple reader devices or multiple POS devices coupled to one reader device). In some examples, there could be multiple POS devices(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology.

The server(s) 106, also described herein as the payment processing service 106, may include one or more components including, for example, one or more processors 138, one or more network interfaces 140, and/or memory 142. The memory 142 may include one or more components such as, for example, an EMV kernel 144, the one or more data stores 146 (described above), one or more machine learning models 148, the one or more APIs 150 (described above), and/or the payment processing component 152 (described above). These components will be described below by way of example.

For example, the COTS device 102 may include one or more of the components described above for ensuring temporal and/or spatial separation of PAN data and PIN data on the COTS device 102. In some examples, the ECR 126 may be embedded into a card reader library and in these examples the ECR 126 may communicate directly with the POS application 124 and the NFC component 122 of the COTS device 102. In this example, the ECR 126 may be utilized to acquire PAN data from a payment instrument and to provide the PAN data to the POS application 124. The POS application 124 may then be configured to associate a default PIN with the PAN data and send an send a tender request to the payment processing service 106 with the PAN data and the default PIN. By sending the PAN data and the default PIN to the payment processing service 106, the payment processing service 106 may have the necessary information to initiate a payment process, but may not be able to complete the process because an account PIN has not yet been received. The default PIN may be a predefined PIN that the payment processing service 106 is configured to recognize for purposes of enabling the processes described herein to increase security of COTS device transactions.

Once the PAN data and the default PIN are sent to the payment processing service 106, the POS application 124 may be configured to delete or otherwise remove the PAN data from the COTS device 102 prior to requesting the account PIN from the buyer. By so doing, the PAN data and the PIN data for the account PIN are not present on the COTS device 102 at the same time. This temporal separation of PAN data and PIN data may hinder a nefarious actor from acquiring both pieces of information needed to utilize a payment instrument to make a payment. Once the PAN data is removed, a PIN entry dialog may be displayed to the buyer, and the buyer may provide user input representing the account PIN. The PIN application 134, in examples, may be configured to receive the user input and generate the PIN data. In some examples, the POS application 124 and the PIN application 134 may be the same application. In other examples, the POS application 124 and the PIN application 134 may be separate applications, which may increase the spatial separation between applications handling PAN data and applications handling PIN data. The PIN data may be sent to the payment processing service 106, which may then send an authorization request for the payment to an issuer of the payment instrument. The issuer may compare the account PIN as entered to a reference PIN associated with the PAN, and determine whether the account PIN as entered is authorized for the PAN. When authorized, the issuer may return an authorization response to the payment processing service 106. The payment processing service 106 may provide an authorization indication to the COTS device 102, which may complete the transaction. By utilizing the process described above, payment instrument security is increased in a computer-centric way that is performed on-the-fly and in a time sensitive manner.

In other examples, the ECR 126 and card reader library may be separated and the ECR 126 may be utilized as an isolated service. In these examples, the card reader library may act as the intermediary application 128 between the ECR 126 and the POS application 124. This spatial separation of the ECR 126 and the POS application 124 may provide for a smaller attack surface for payment kernels and ensures that the ECR 126 runs outside the POS application 124, which may be the most likely point of attack by a nefarious actor. In these examples, multiple trust applications 132 may be utilized to determine whether the COTS device 102 is still a trusted device at the time of a payment. Additional details on the use of the trust applications 132 is provided herein, but generally the trust applications 132 may be utilized to determine whether one or more conditions of the COTS device 102 indicate that the COTS device 102 has been compromised or otherwise is no longer a trusted device for acquiring PAN data and/or PIN data. In examples where the intermediary application 128 is utilized, a trust application 132 may be utilized for determining whether the POS application 124 has been compromised and another trust application 132 may be utilized for determining whether the intermediary application 128 has been compromised. In these examples, the POS application 124 may still perform the default PIN addition processes described above.

In other examples, spatial and/or temporal separation of PIN data and PAN data may not be performed, and instead an encryption scheme may be utilized to promote the security of PIN data and PAN data. This encryption-based scheme is described in more detail below with respect to FIG. 2. In these examples, encryption of the PIN data may be performed utilizing one encryption technique and/or first encryption credentials (e.g., key(s)), while encryption of the PAN data may be performed utilizing a different encryption techniques and/or second encryption credentials. In other examples, encryption of the PIN data and the PAN data may be performed utilizing the same encryption technique.

The trust applications 132 may be configured with an augmented tamper and fraud detection methodology (e.g., trust routine), which is described in greater detail in U.S.

patent application Ser. Nos. 15/199,917 and 15/199,933, which are incorporated herein by reference, in their entirety. In some examples, one or more trust commands may be initiated on one or more target device(s) (e.g., user device and/or merchant device(s)). The trust commands include varying levels of specificity and granularity, such as hashing a portion of a software code, scanning memory of the payment entity, checking for jail-breaking of the software code, gathering metadata of a mounted file system, or the like. The trust commands may be based on reliably measured data or test criteria collected over a population of payment platforms or pre-set values determined by security experts. After incorporation of the trust routine, the service may assign the user device and/or the merchant device as a trusted device for a pre-determined period of time. In various examples, the service may assign an attestation ticket to the trusted device(s) for future interactions. In such examples, at the lapse of the time period, the attestation routine can be re-initialized and re-executed to attest the trusted device. Accordingly, the trusted device may be used to securely transfer transaction data, payment instrument data, and/or verification data between the transaction server and the user device and/or merchant device to conduct secure transactions and decrease instances of fraud.

In still other examples, the ECR 126 may be deployed to the COTS device 102 as a separate application utilizing the card reader library as a separated application. In these examples, the ECR 126 may be responsible for performing the default PIN addition processes. Again, this embodiment allows for a smaller attack surface for the payment kernel, and increases spatial separation of processes performed as between the POS application 124 and the ECR application 126. Another benefit of this embodiment is that NFC communication is isolated from the POS application 124, as the ECR application 126 handles many of the operations that would have been performed on the POS application 124. As the intermediary application 128 is utilized in this embodiment, two trust applications 132 may be utilized, as described above.

In still other examples, data encryption may be utilized at the COTS device 102 such that decryption of at least the PAN data, and the PIN data in some examples, is performed on the COTS device 102 and the payment processing service 106 is utilized to identify the PAN data and/or the PIN data from encrypted data sent to the payment processing service 106. For example, an encryption API may be utilized to encrypt the PAN data read from the NFC component 122. The COTS device 102 may not include the necessary keys or other decryption mechanisms to decrypt the encrypted data. In this example, the POS application 124 may receive the encrypted data from the NFC component 122, and the POS application 124 may send the encrypted data to the payment processing service 106. The payment processing service 106 may manage the keys and/or other decryption mechanisms and may decrypt the encrypted data to identify the PAN data and/or the PIN data. The encrypted data may be described as encrypted EMV data when EMV protocols are utilized for acquiring data from the payment instrument. In this example, the EMV kernel 130 and/or the EMV kernel 144 may be isolated from other components to minimize vulnerabilities in EMV parsers utilized during processing. The EMV kernel 144 may parse the EMV data to identify the PAN data, as described herein.

In still other examples, data encryption may be utilized at the COTS device 102 such that decryption of at least the PAN data, and the PIN data in some examples, is performed on the COTS device 102 and the payment processing service 106 is utilized to identify the PAN data and/or the PIN data from encrypted data sent to the payment processing service 106. For example, the encryption API may be utilized to encrypt the PAN data read from the NFC component 102. The COTS device 102 may not include the necessary keys or other decryption mechanisms to decrypt the encrypted data. In this example, instead of the encrypted data being sent to the POS application 102, the encrypted data is sent to a vendor datacenter 154, which may be operated by an OEM of the COTS device 102. The OEM may have the keys and/or other decryption mechanisms to decrypt the encrypted data and identify the PAN data and/or the PIN data. The payment processing service 106 may query the OEM for the PAN data and/or for an encrypted version of the PAN data that can be decrypted by the payment processing service 106 to complete the transaction. In this example, the POS application 124 merely receives indications of payment states from other components of the COTS device 102 and/or from the payment processing service 106, but the PAN data is spatially separated from the POS application 124 at all times during the transaction.

In still other examples, the TEE 136 may be utilized to enhance ECR security on the COTS device 102. For example, when the PAN data is read by the NFC component 122, the PAN data may be sent to the TEE 136, which may be isolated from other components of the COTS device 102. The TEE 136 may provide more security than the POS application 124 in restricting access to the TEE 136 without proper authorization. In this example, the TEE 136 may communicate with the payment processing service 106 to send the PAN data and/or an encrypted version of the PAN data. The payment processing service 106 may utilize this data to determine whether a payment is authorized, and payment transaction indications may be sent from the payment processing service 106 to the POS application 124, such as to indicate whether a payment is authorized. In this way, the POS application 124 may not have access to the PAN data but instead may progress through a transaction based at least in part on indications received from the payment processing service 106.

By performing one or more of the techniques described herein, spatial and/or temporal separation of PAN data from other data utilized for a transaction, such as PIN data, promotes security of the transaction and makes unauthorized access to all information needed to nefariously utilize the payment instrument difficult to obtain. These techniques are specific to the computer-centric problem of handling digital transactions on COTS devices 102 where such devices may be compromised and unauthorized access may occur. These techniques are also specific to computer-centric solutions that utilize specifically-configured applications, application arrangements, encryption/decryption schemes, TEEs, and other components that could not be performed by a human being, whether as a mental process or through physical means. This added security is also implemented in a time-sensitive manner between when a transaction is initiated and when that transaction is completed (i.e., a matter of seconds), minimizing latency in the payment process.

In at least one example, operations performed by the payment processing service can leverage a multi-party merchant ecosystem. That is, in some examples, a payment processing service (e.g., server(s) associated therewith) can communicate with end users (e.g., customers and/or merchants) via respective user computing devices, and over one or more networks. Such a remote, network-connected multi-party merchant ecosystem can enable the payment processing service to access data associated with multiple, different merchants and/or customers, and use such data for improving ECR security, in some examples, in real time or near-real time. Having a payment processing service, which may have access to multiple disparate merchants and multiple disparate platforms, perform the processes associated with those described herein allows for the unique generation and use of merchant-related data to increase ECR security with respect to any given merchant.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

Additionally, the models 148 may be trained based on transaction information and/or other information associated with payment transactions. For example, transaction information of transactions performed between multiple merchants and multiple buyers may be received at the payment processing service 106. This information may be received from merchant computing devices associated with the merchants. In these examples, the merchant computing devices may have respective instances of a merchant application installed thereon for configuring the merchant computing devise as point-of-sale (POS) terminals, respectively. The respective instances of the merchant application may configure the POS terminals to communicate the transaction information over one or more networks to the payment processing service 106. In some examples, the POS terminals could be online terminals. Utilizing the transaction information, the payment processing service 106 may generate profiles, using a model trained using at least one of merchant information, buyer information, and/or the transaction information.

In some implementations, the methods and systems described herein can be integrated with voice services (e.g. Amazon's ALEXA®, Apple's SIRI®, or Microsoft's CORTANA®) through specific API calls to such services from within the multimedia interface. The present methods and systems can integrate with the "wake words" for invoking their respective voice service, ecommerce and fulfillment channels. For example, speaker recognition techniques may be utilized to determine user profiles associated with users that provide user utterances to user devices for performing one or more of the operations described herein. The determined user profile may be utilized to customize the security protocols described herein. In addition, the voice interface may be associated with an online platform, and that platform may be utilized to fulfill merchant commands as described herein.

Figure 1B:
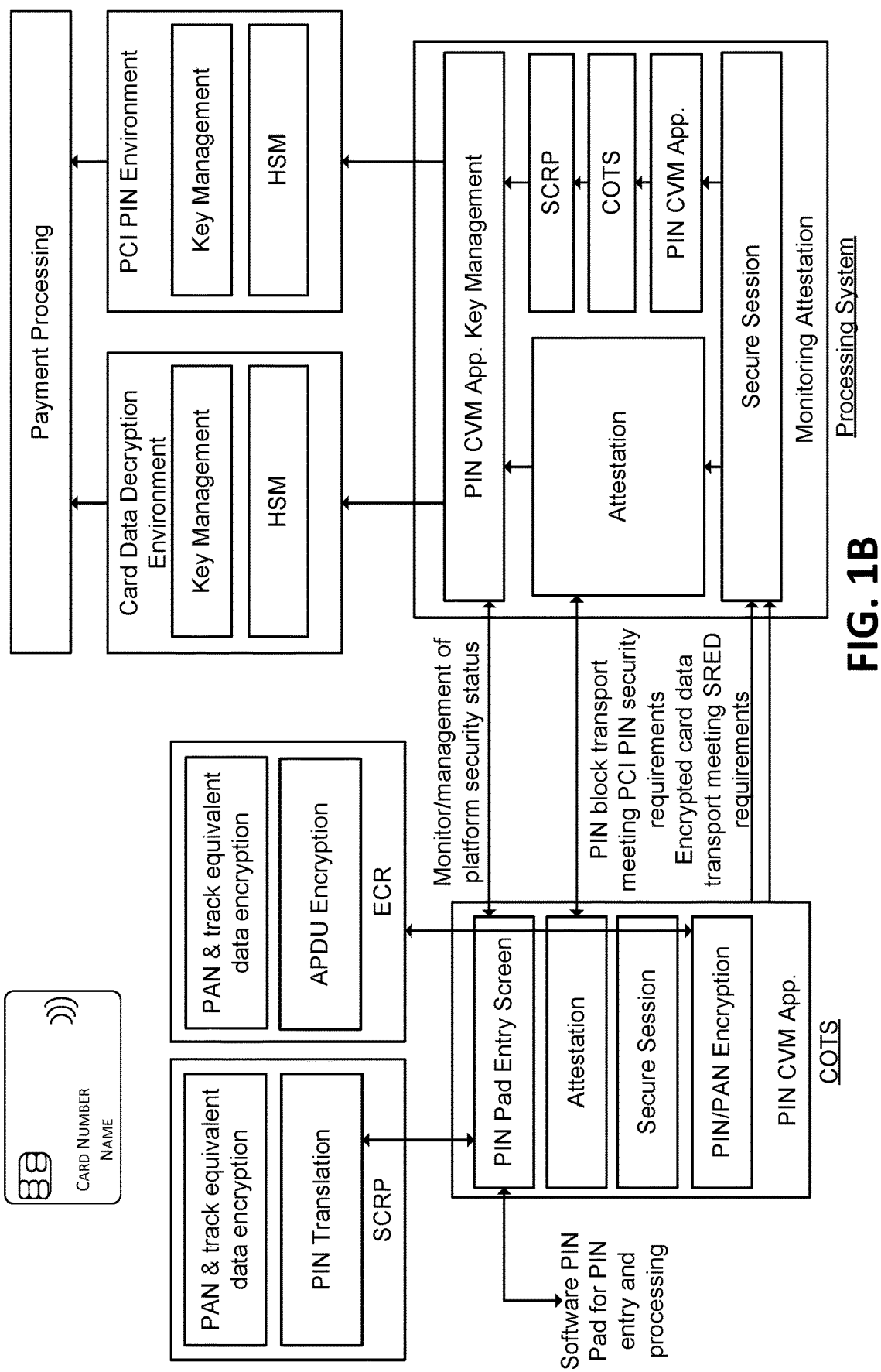
FIG. 1B illustrates a conceptual diagram of components utilized for performing software personal identification number (PIN) on consumer off-the-shelf devices (SPoC) techniques and ECR techniques.

FIG. 1B illustrates a conceptual diagram of components utilized for performing SPoC and ECR techniques. FIG. 1B is utilized herein to provide an example process flow of a PIN transaction in a software-based PIN entry solution. As shown in FIG. 1B, a COTS device, such as a merchant device 102, may be present and that COTS device may include a PIN cardholder verification method (CVM) application installed thereon, such as POS application 124 and/or PIN application 134. The COTS device may be associated with a PIN pad entry screen, an attestation component, and a secure session component. Additionally, a secure card reader—PIN (SCRP) may be present. The SCRP may include a physical card reader, such as a reader device 175, may include a PCR that has been assessed to be compliant. In examples, the SCRP can be coupled to the merchant device via a wired or wireless connection, such as via a Bluetooth®, BLE, and so on. Additional details are described below with reference to FIGS. 15 and 16. In some examples, the SCRP can read information from payment instruments. In some examples, the SCRP may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). In some examples, POS devices and reader devices can be configured in one-to-one pairings. In other examples, the POS devices and reader devices can be configured in many-to-one pairings (e.g., one POS device coupled to multiple reader devices or multiple POS devices coupled to one reader device). In some examples, there could be multiple POS devices(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. In examples, the card reader library and/or intermediary application as described herein may be configured to assist with establishing and/or facilitating secure exchange of data between the SCRP and the POS application(s) 124 and/or ECR 126

The SCRP may include components utilized for PIN translation and to acquire PAN data and track equivalent data encryption. A buyer device and/or payment instrument may also be present to perform the SPoC techniques described herein. In addition to the SCRP, or instead of the SCRP, an ECR such as ECR 126 may be present. The ECR may not be a separate physical card reader like the SCRP, but instead may include components that are embedded in the COTS device. The ECR may be configured to encrypt the PAN data and to monitor data encryption associated with a payment. In an example, the ECR may be configured to also encrypt application protocol data units (APDUs) that are communicated by the ECR to other components, such as to the POS applications, like the POS application 124, and/or other components of the COTS device.

One or more devices and/or systems may be in communication with the COTS device and may include a monitoring attestation component, an instance of a PIN CVM application, a COTS component, a SCRP component, an attestation component, and/or other components that may be utilized for PIN CVM application key management and/or attestation purposes. The devices and/or systems may include a card data decryption environment and/or a payment card industry (PCI) PIN environment. Within the card data decryption environment, key management processes may be performed as well as PIN transaction security hardware security module (HSM) security requirements. Additionally, payment processing processes may also be performed as described herein. When the ECR is utilized as opposed to the SCRP, the PIN/PAN encryption component of the COTS device may be utilized for encryption of PIN and/or PAN data as described more fully herein. In some examples, a key may be utilized for PIN and/or PAN encryption.

Utilizing some or all of the components described herein, the following SPoC techniques may be performed to utilize a software PIN for securing and/or authorizing a transaction. First, the PIN CVM application on the COTS device and the SCRP may be initialized with keys. This process may be asynchronous with the transaction at issue. Then, a secure communication channel between the PIN CVM application and the back-end monitoring system may be established. To do this, the secure session components of the COTS device and the secure session components of the other device may communicate to establish a secure session.

Thereafter, the back-end monitoring system may determine the security status of the mobile payment-acceptance platform utilizing the attestation components described herein. During this process, the SCRP, ECR, COTS platform, and PIN CVM application may communicate to determine the security status among the devices and components and attestation may be performed. Attestation may include actions between a verifier, which may be server-based, and a prover, which may be client-based, to determine the current security state/behavior of the prover based on predefined measurements and thresholds provided by the prover.

Then, a payment card and/or other device capable of transmitting card data, such as a buyer device, may be presented to the SCRP. The PIN CVM application PIN entry component may render the PIN entry screen on the COTS platform and the cardholder may enter his/her PIN using the rendered PIN pad from the PIN CVM application. The resulting data may be enciphered and sent to the SCRP by the PIN CVM application. The SCRP may encipher the PAN data using preloaded data encryption keys utilizing online PIN verification or offline PIN verification processes. Thereafter, the payment transaction may be processed utilizing the payment processing components described herein.

Alternatively, a payment card and/or other device capable of transmitting card data, such as a buyer device, may be presented to the ECR for purposes of collecting PAN data. For example, a POS application may send a start-payment request to the ECR. The ECR may send an application protocol data unit (APDU) command to the POS application. The APDU command may initiate the process of causing a reader to acquire data from a payment instrument. For example, the ECR may generate and/or utilize a stored APDU command and may send that command to the POS application such that the POS application and the NFC component may communicate directly to acquire a PAN associated with the buyer's payment instrument. The POS application may send an instance of the APDU command to the NFC component. The NFC component may then send an APDU response to the POS application. The APDU response may include the PAN data as read from the payment instrument. The ECR may send a PIN entry request to the POS application. Generally, for PIN-on-glass and SPoC transactions, the request for entry of a PIN is made to gather the required account PIN to associate with the PAN data. However, in this example, to promote temporal separation of PAN data and PIN data on the merchant device, the response to the PIN entry request may not cause display of a PIN entry user interface or otherwise cause the device to acquire PIN data. Instead, the POS application may send a default PIN to the ECR and the ECR may send an authorization request to the POS application. At this point, the POS application may have all the data needed to request authorization for the payment utilizing the payment instrument from the payment processing service. Once the PAN data is removed from the device as described herein, the request for the actual PIN may be made. The PIN CVM application PIN entry component may render the PIN entry screen on the COTS platform and the cardholder may enter his/her PIN using the rendered PIN pad from the PIN CVM application.

In other examples, spatial and/or temporal separation of PIN data and PAN data may not be performed, and instead an encryption scheme may be utilized to promote the security of PIN data and PAN data. This encryption-based scheme is described in more detail below with respect to FIG. 2. The PAN data may be acquired using ECR as described herein. The PIN CVM application PIN entry component may render the PIN entry screen on the COTS platform and the cardholder may enter his/her PIN using the rendered PIN pad from the PIN CVM application. In these examples, encryption of the PIN data may be performed utilizing one encryption technique and/or first encryption credentials (e.g., key(s)), while encryption of the PAN data may be performed utilizing a different encryption techniques and/or second encryption credentials. In other examples, encryption of the PIN data and the PAN data may be performed utilizing the same encryption technique.

In still other examples, the POS application, having received an indication that the payment process is to be initiated, may generate and send the start-payment request to an intermediary application. This spatial separation of the ECR and the POS application may provide for a smaller attack surface for payment kernels and ensures that the ECR runs outside the POS application, which may be the most likely point of attack by a nefarious actor. In these examples, multiple trust applications may be utilized to determine whether the merchant device is still a trusted device at the time of a payment. Additional details on the use of trust applications is provided herein, but generally the trust applications may be utilized to determine whether one or more conditions of the merchant device indicate that the merchant device has been compromised or otherwise is no longer a trusted device for acquiring PAN data and/or PIN data. In examples where the intermediary application is utilized, a trust application may be utilized for determining whether the POS application has been compromised and another trust application may be utilized for determining whether the intermediary application has been compromised. In these examples, the POS application may still perform the default PIN addition processes described above. When the actual PIN is requested, the PIN CVM application PIN entry component may render the PIN entry screen on the COTS platform and the cardholder may enter his/her PIN using the rendered PIN pad from the PIN CVM application.

In still other examples, an ECR application may perform security operations associated with the payment. In these examples, in addition to the use of an intermediary application, the intermediary application may send an instance of the start-payment request to the ECR application. For example, when a trust routine indicates that the intermediary application has not been compromised, the intermediary application may send the instance of the start-payment request to the ECR application. The ECR application may send an APDU command to the NFC component, and further communications between the NFC component and the POS application may utilize the ECR application.

In examples, the PIN is entered on a touchscreen of the COTS device. However, in some examples, a buyer device is utilized for entering the PIN, and the attestation, monitoring, and other operations associated with SPoC techniques are performed in association with the buyer device.

Figure 2:
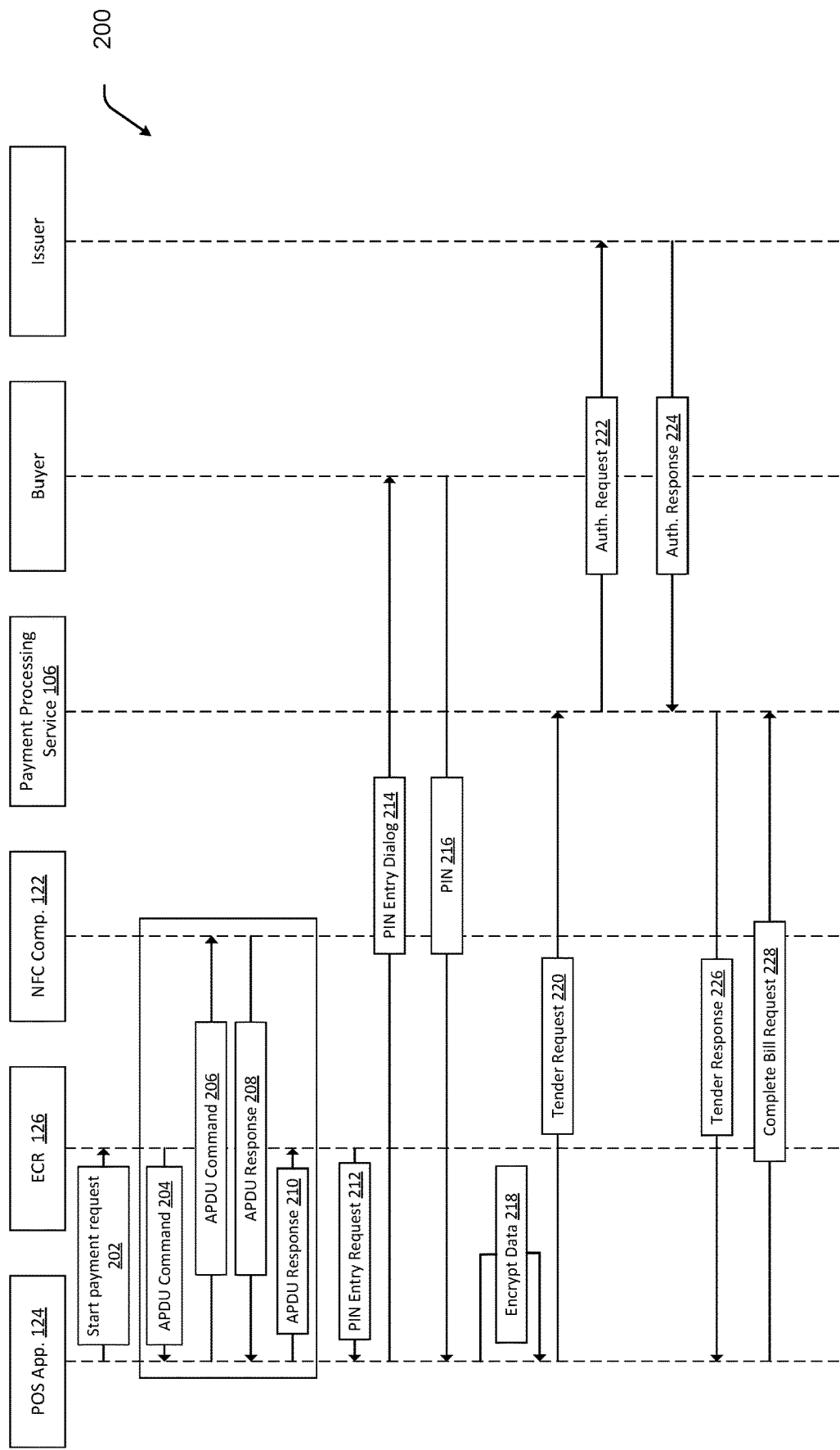
FIG. 2 illustrates an example process associated with securing a payment utilizing an ECR without generation of a default PIN.

FIG. 2 illustrates an example process associated with securing a payment utilizing an ECR without generation of a default personal identification number (PIN). FIG. 2 provides a sequence diagram indicating an example sequence of processes. It should be understood that the sequence provided in FIG. 2 is provided by way of example, not as a limitation, and that some or all of the operations described in FIG. 2 may be performed in a different order and/or in parallel.

At block 202, the POS application 124 may send a start-payment request to the ECR 126. For example, a merchant may add products to a transaction to be purchased by a buyer, and when all of the products the buyer wishes to buy have been added, the merchant may initiate a payment process for satisfying payment for the products. The POS application 124, having received an indication that the payment process is to be initiated, may generate and send the start-payment request to the ECR 126.

At block 204, the ECR 126 may send an application protocol data unit (APDU) command to the POS application 124. The APDU command may initiate the process of causing a reader to acquire data from a payment instrument. For example, the ECR 126 may generate and/or utilize a stored APDU command and may send that command to the POS application 124 such that the POS application 124 and the NFC component 122 may communicate directly to acquire a PAN associated with the buyer's payment instrument.

At block 206, the POS application 124 may send an instance of the APDU command to the NFC component 122. Sending of the APDU command to the NFC component 122 may cause the NFC component 122 to initiate and/or to read PAN data from a payment instrument and/or to send read PAN data to one or more components of the merchant device.

At block 208, the NFC component 122 may send an APDU response to the POS application 124. The APDU response may include the PAN data as read from the payment instrument. The APDU response may also include other information associated with acquiring data from the payment instrument, such as encryption-related data when encryption is utilized.

At block 210, the POS application 124 may send the APDU response and/or an indication of the APDU response to the ECR 126. For example, the POS application 124 may indicate to the ECR 126 that responsive data has been received from the NFC component 122 and that the payment processing is to proceed.

At block 212, the ECR 126 may send a PIN entry request to the POS application 124. Generally, for PIN-on-glass and SPoC transactions, the request for entry of a PIN is made to gather the required account PIN to associate with the PAN data.

At block 214, the POS application 124 may cause a PIN entry dialog to be presented to a buyer. In other embodiments where SPoC is utilized, the POS application 124 may query one or more devices, such as a buyer device 104 and/or a remote system, for the software PIN as described more fully herein. For example, a user interface of the merchant device may display a PIN entry dialog, such as a PIN pad, configured to accept user input corresponding to the account PIN. In the SPoC embodiment, the merchant device may query one or more devices to receive the software PIN, as described more fully herein.

At block 216, user input data representing the account PIN and/or the software PIN may be received at the POS application 124. At this point, the POS application 124 may have stored in association therewith the account PIN and/or software PIN as well as the PAN data.

At block 218, the POS application 124 may perform encryption of the PIN data and the PAN data. In examples, encryption of the PIN data may be performed utilizing one encryption technique and/or first encryption credentials (e.g., key(s)), while encryption of the PAN data may be performed utilizing a different encryption techniques and/or second encryption credentials. In other examples, encryption of the PIN data and the PAN data may be performed utilizing the same encryption technique.

At block 220, the POS application 124 may send a tender request to the payment processing service 106. The tender request may include an identifier of the payment at issue, the PAN data, which may be encrypted in certain examples, and the account PIN.

At block 222, the payment processing service 106 may send an authorization request indicating the PAN data and the account PIN to an issuer of the payment instrument utilized to satisfy the payment. The issuer may utilize the PAN data and the account PIN to determine whether to authorize the payment. If the payment instrument is associated with an account with sufficient funds to satisfy the payment, and if the account PIN is the PIN associated with the payment instrument, the issuer may authorize the payment.

At block 224, the issuer may return an authorization response, which may indicate whether the payment instrument is accepted or denied for satisfying the payment. In examples, the authorization response may not include the PAN data and/or the account PIN, but may instead include an indication of payment approval or denial.

At block 226, the payment processing service 106 may send a tender response to the POS application 124. The tender response may indicate to the POS application 124 that the tender request was received but that the account PIN is still needed.

At block 228, the POS application 124 may send a complete-bill request to the payment processing service 106. For example, when the issuer has approved use of the payment instrument to satisfy the payment, the POS application 124 may generate the complete-bill request, which indicates that requirements for completing the payment have been met and that the open bill associated with the payment is to be completed. The payment processing service 106 may utilize the complete-bill request to update its system to indicate that a status of the payment is complete.

Figure 3:
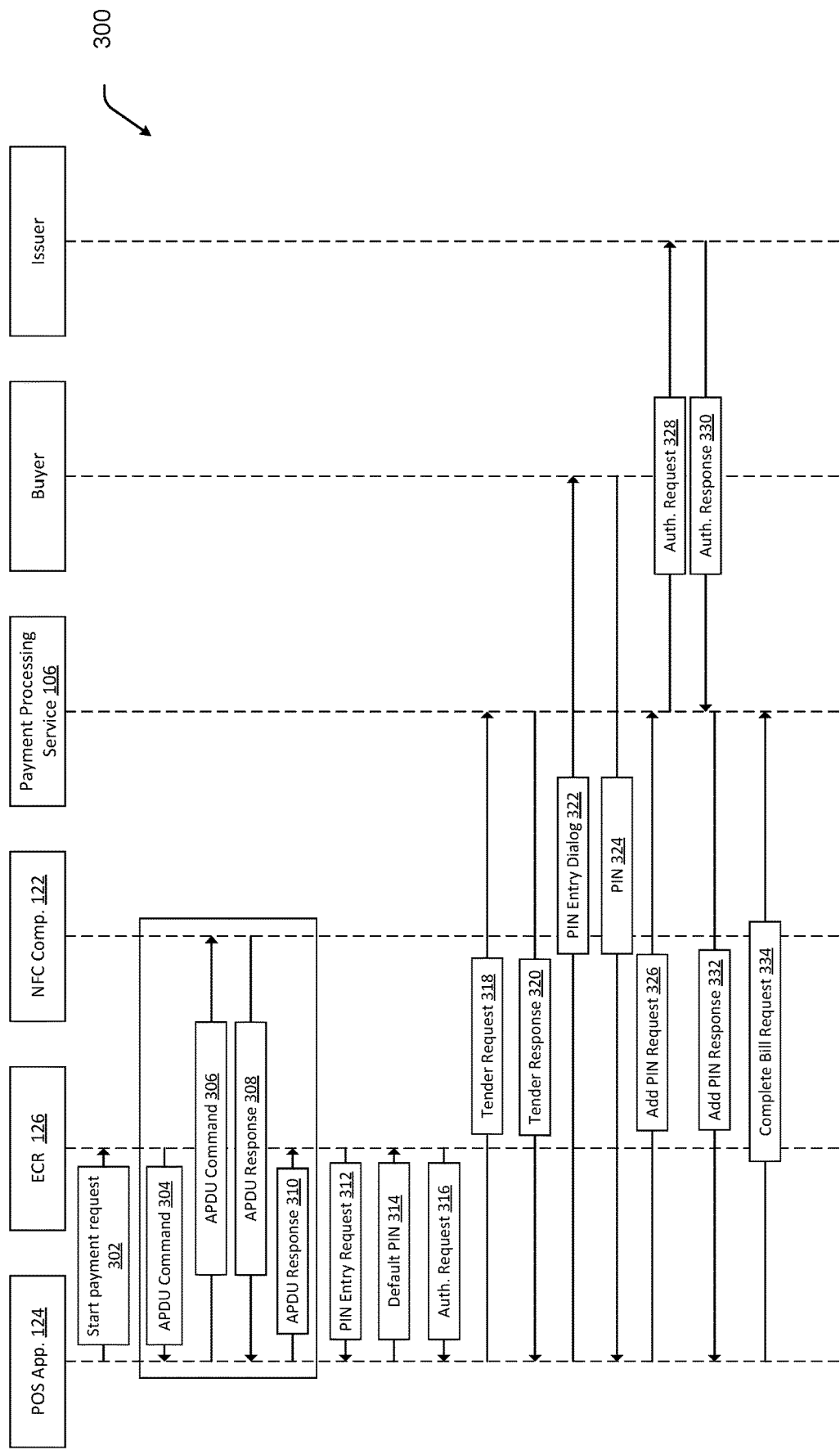
FIG. 3 illustrates an example process associated with securing a payment utilizing an ECR, where a point of sale (POS) application communicates directly with an ECR.

FIG. 3 illustrates an example process 300 associated with securing a payment utilizing an ECR, where a POS application communicates directly with the ECR. FIG. 3 provides a sequence diagram indicating an example sequence of processes. It should be understood that the sequence provided in FIG. 3 is provided by way of example, not as a limitation, and that some or all of the operations described in FIG. 3 may be performed in a different order and/or in parallel.

At block 302, the POS application 124 may send a start-payment request to the ECR 126. For example, a merchant may add products to a transaction to be purchased by a buyer, and when all of the products the buyer wishes to buy have been added, the merchant may initiate a payment process for satisfying payment for the products. The POS application 124, having received an indication that the payment process is to be initiated, may generate and send the start-payment request to the ECR 126.

At block 304, the ECR 126 may send an application protocol data unit (APDU) command to the POS application 124. The APDU command may initiate the process of causing a reader to acquire data from a payment instrument. For example, the ECR 126 may generate and/or utilize a stored APDU command and may send that command to the POS application 124 such that the POS application 124 and the NFC component 122 may communicate directly to acquire a PAN associated with the buyer's payment instrument.

At block 306, the POS application 124 may send an instance of the APDU command to the NFC component 122. Sending of the APDU command to the NFC component 122 may cause the NFC component 122 to initiate and/or to read PAN data from a payment instrument and/or to send read PAN data to one or more components of the merchant device.

At block 308, the NFC component 122 may send an APDU response to the POS application 124. The APDU response may include the PAN data as read from the payment instrument. The APDU response may also include other information associated with acquiring data from the payment instrument, such as encryption-related data when encryption is utilized.

At block 310, the POS application 124 may send the APDU response and/or an indication of the APDU response to the ECR 126. For example, the POS application 124 may indicate to the ECR 126 that responsive data has been received from the NFC component 122 and that the payment processing is to proceed.

At block 312, the ECR 126 may send a PIN entry request to the POS application 124. Generally, for PIN-on-glass and SPoC transactions, the request for entry of a PIN is made to gather the required account PIN to associate with the PAN data. However, here, to promote temporal separation of PAN data and PIN data on the merchant device, the response to the PIN entry request may not cause display of a PIN entry user interface or otherwise cause the device to acquire PIN data.

Instead, at block 314, the POS application 124 may send a default PIN to the ECR 126. The default PIN may be any numeric, alphabetic, and/or alpha-numeric code that has been predetermined to be a default code to satisfy a requirement that PAN data, when sent to the payment processing service 106, includes a PIN. However, since the PIN is not the actual account PIN associated with the payment instrument, the default PIN cannot be utilized to complete the transaction.

At block 316, the ECR 126 may send an authorization request to the POS application 124. At this point, the POS application 124 may have all the data needed to request authorization for the payment utilizing the payment instrument from the payment processing service 106. Additionally, the data needed to satisfy requirements of the ECR 126 for proceeding with the payment process may have also been satisfied.

At block 318, the POS application 124 may send a tender request to the payment processing service 106. The tender request may include an identifier of the payment at issue, the PAN data, which may be encrypted in certain examples, and the default PIN. The payment processing service 106 may receive the tender request and identify the included PIN as the default PIN. Based at least in part on the tender request including the default PIN, the payment processing service 106 may determine whether the default PIN that was received corresponds to the predefined default PIN. It should be understood that while one default PIN is described, the default PIN may be dynamic and may change, such as over time and/or based on characteristics of the merchant, buyer, transaction, and/or any other factor associated with the payment. At this point, the POS application 124 may remove the PAN data from the merchant device such that, before the account PIN is provided to the merchant device, the PAN data is not present on the merchant device.

At block 320, the payment processing service 106 may send a tender response to the POS application 124. The tender response may indicate to the POS application 124 that the tender request was received but that the account PIN is still needed.

At block 322, the POS application 124 may cause a PIN entry dialog to be presented to a buyer. In other embodiments where SPoC is utilized, the POS application 124 may query one or more devices, such as a buyer device 104 and/or a remote system, for the software PIN as described more fully herein. For example, a user interface of the merchant device may display a PIN entry dialog, such as a PIN pad, configured to accept user input corresponding to the account PIN. In the SPoC embodiment, the merchant device may query one or more devices to receive the software PIN, as described more fully herein.

At block 324, user input data representing the account PIN and/or the software PIN may be received at the POS application 124. At this point, the POS application 124 may have stored in association therewith the account PIN and/or software PIN, but not the PAN data given that the PAN data was previously removed from the merchant device as described above.

At block 326, an add-PIN request may be sent to the payment processing service 106. The add-PIN request may include the account PIN and, in examples, an identifier of the payment at issue. At this point, the payment processing service 106 may associate the account PIN with the PAN data for the payment.

At block 328, the payment processing service 106 may send an authorization request indicating the PAN data and the account PIN to an issuer of the payment instrument utilized to satisfy the payment. The issuer may utilize the PAN data and the account PIN to determine whether to authorize the payment. If the payment instrument is associated with an account with sufficient funds to satisfy the payment, and if the account PIN is the PIN associated with the payment instrument, the issuer may authorize the payment.

At block 330, the issuer may return an authorization response, which may indicate whether the payment instrument is accepted or denied for satisfying the payment. In examples, the authorization response may not include the PAN data and/or the account PIN, but may instead include an indication of payment approval or denial.

At block 332, the payment processing service 106 may send an add-PIN response to the POS application 124. The add-PIN response may be in response to the add-PIN request described above and may indicate that the payment instrument has been approved or denied for satisfying the payment.

At block 334, the POS application 124 may send a complete-bill request to the payment processing service 106. For example, when the issuer has approved use of the payment instrument to satisfy the payment, the POS application 124 may generate the complete-bill request, which indicates that requirements for completing the payment have been met and that the open bill associated with the payment is to be completed. The payment processing service 106 may utilize the complete-bill request to update its system to indicate that a status of the payment is complete.

Figure 4:
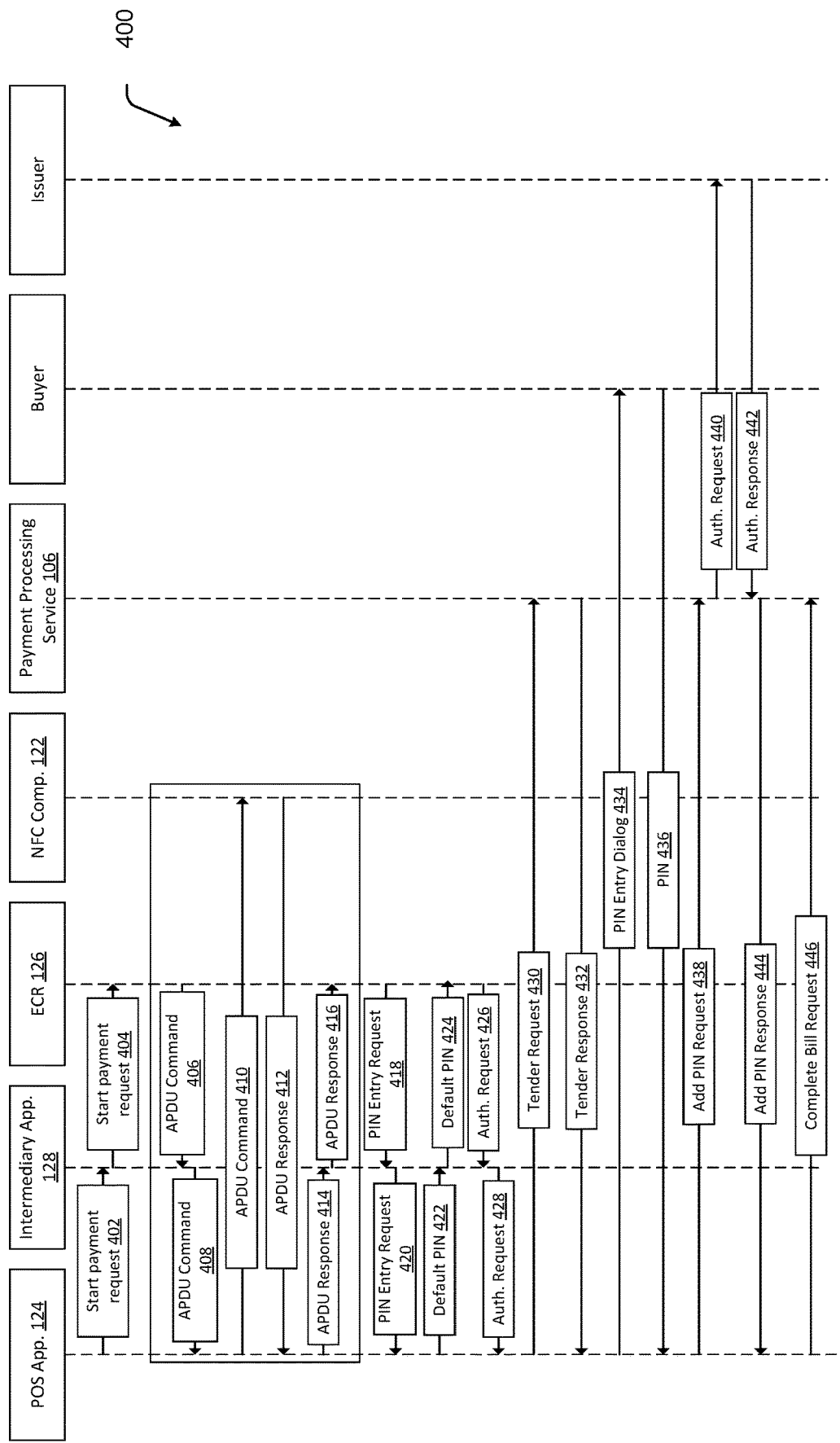
FIG. 4 illustrates an example process associated with securing a payment utilizing an intermediary application configured to communicate with the POS application and the ECR.

FIG. 4 illustrates an example process 400 associated with securing a payment utilizing an intermediary application configured to communicate with the POS application 124 and the ECR 126. FIG. 4 provides a sequence diagram indicating an example sequence of processes. It should be understood that the sequence provided in FIG. 4 is provided by way of example, not as a limitation, and that some or all of the operations described in FIG. 4 may be performed in a different order and/or in parallel.

At block 402, the POS application 124 may send a start-payment request to an intermediary application 128, which may be described herein as a card reader library application. For example, a merchant may add products to a transaction to be purchased by a buyer, and when all of the products the buyer wishes to buy have been added, the merchant may initiate a payment process for satisfying payment for the products. The POS application 124, having received an indication that the payment process is to be initiated, may generate and send the start-payment request to the intermediary application 128. This spatial separation of the ECR 126 and the POS application 124 may provide for a smaller attack surface for payment kernels and ensures that the ECR 126 runs outside the POS application 124, which may be the most likely point of attack by a nefarious actor. In these examples, multiple trust applications may be utilized to determine whether the merchant device is still a trusted device at the time of a payment. Additional details on the use of trust applications is provided herein, but generally the trust applications may be utilized to determine whether one or more conditions of the merchant device indicate that the merchant device has been compromised or otherwise is no longer a trusted device for acquiring PAN data and/or PIN data. In examples where the intermediary application 128 is utilized, a trust application may be utilized for determining whether the POS application 124 has been compromised and another trust application may be utilized for determining whether the intermediary application 128 has been compromised. In these examples, the POS application 124 may still perform the default PIN addition processes described above.

At block 404, the intermediary application 128 may send an instance of the start-payment request to the ECR 126. For example, when a trust routine indicates that the intermediary application 128 has not been compromised, the intermediary application 128 may send the instance of the start-payment request to the ECR 126.

At block 406, the ECR 126 may send an APDU command to the intermediary application 128. The APDU command may initiate the process of causing a reader to acquire data from a payment instrument. For example, the ECR 126 may generate and/or utilize a stored APDU command and may send that command to the intermediary application 128 to be sent to the POS application 124.

At block 408, the intermediary application 128 may send an instance of the APDU command to the POS application 124. For example, when a trust routine indicates that the intermediary application 128 has not been compromised, the intermediary application 128 may send the instance of the APDU command to the POS application 124.

At block 410, the POS application 124 may send an APDU command to the NFC component 122. Sending of the APDU command to the NFC component 122 may cause the NFC component 122 to initiate and/or to read PAN data from a payment instrument and/or to send read PAN data to one or more components of the merchant device.

At block 412, the NFC component 122 may send an APDU response to the POS application 124. The APDU response may include the PAN data as read from the payment instrument. The APDU response may also include other information associated with acquiring data from the payment instrument, such as encryption-related data when encryption is utilized.

At block 414, the POS application 124 may send an instance of the APDU response to the intermediary application 128. The POS application 124 may send the instance of the APDU response to the intermediary application 128 instead of directly to the ECR 126 to continue the spatial separation for data sent between the POS application 124 and the ECR 126.

At block 416, the intermediary application 128 may send an instance of the APDU response to the ECR 126. For example, when a trust routine indicates that the intermediary application 128 has not been compromised, the intermediary application 128 may send the instance of the APDU response to the ECR 126.

At block 418, the ECR 126 may send a PIN entry request to the intermediary application 128. Generally, for PIN-on-glass and SPoC transactions, the request for entry of a PIN is made to gather the required account PIN to associate with the PAN data. However, here, to promote temporal separation of PAN data and PIN data on the merchant device, the response to the PIN entry request may not cause display of a PIN entry user interface or otherwise cause the device to acquire PIN data.

At block 420, the intermediary application 128 may send an instance of the PIN entry request to the POS application 124. Having received the PIN entry request from the intermediary application 128, the POS application 124 may refrain from causing display of a PIN entry dialog.

At block 422, the POS application may generate a default PIN and may send the default PIN to the intermediary application 128. The default PIN may be any numeric, alphabetic, and/or alpha-numeric code that has been predetermined to be a default code to satisfy a requirement that PAN data, when sent to the payment processing service 106, includes a PIN. However, since the PIN is not the actual account PIN associated with the payment instrument, the default PIN cannot be utilized to complete the transaction.

At block 424, the intermediary application 130 may send the default PIN to the ECR 126. For example, when a trust routine indicates that the merchant device has not been compromised, the intermediary application 130 may send the default PIN to the ECR 126.

At block 426, the ECR 126 may generate and send an authorization request to the intermediary application 128. The authorization request may indicate that the data needed to satisfy requirements of the ECR 126 for proceeding with the payment process have been satisfied.

At block 428, the intermediary application 128 may send an instance of the authorization request to the POS application 124. For example, when a trust routine indicates that the merchant device has not been compromised, the intermediary application 130 may send the instance of the authorization request to the POS application 124. At this point, the POS application 124 may have all the data needed to request authorization for the payment utilizing the payment instrument from the payment processing service 106.

At block 430, the POS application 124 may send a tender request to the payment processing service 106. The tender request may include an identifier of the payment at issue, the PAN data, which may be encrypted in certain examples, and the default PIN. The payment processing service 106 may receive the tender request and identify the included PIN as the default PIN. Based at least in part on the tender request including the default PIN, the payment processing service 106 may determine whether the default PIN that was received corresponds to the predefined default PIN. It should be understood that while one default PIN is described, the default PIN may be dynamic and may change, such as over time and/or based on characteristics of the merchant, buyer, transaction, and/or any other factor associated with the payment. At this point, the POS application 124 may remove the PAN data from the merchant device such that, before the account PIN is provided to the merchant device, the PAN data is not present on the merchant device.

At block 432, the payment processing service 106 may send a tender response to the POS application 124. The tender response may indicate to the POS application 124 that the tender request was received but that the account PIN is still needed.

At block 434, the POS application 124 may cause a PIN entry dialog to be presented to a buyer. In other embodiments where SPoC is utilized, the POS application 124 may query one or more devices, such as a buyer device 104, for the software PIN as described more fully herein. For example, a user interface of the merchant device may display a PIN entry dialog, such as a PIN pad, configured to accept user input corresponding to the account PIN. In the SPoC embodiment, the merchant device may query one or more devices to receive the software PIN, as described more fully herein.

At block 436, user input data representing the account PIN and/or the software PIN may be received at the POS application 124. At this point, the POS application 124 may have stored in association therewith the account PIN and/or software PIN, but not the PAN data given that the PAN data was previously removed from the merchant device as described above.

At block 438, an add-PIN request may be sent to the payment processing service 106. The add-PIN request may include the account PIN and, in examples, an identifier of the payment at issue. At this point, the payment processing service 106 may associate with the account PIN with the PAN data for the payment.

At block 440, the payment processing service 106 may send an authorization request indicating the PAN data and the account PIN to an issuer of the payment instrument utilized to satisfy the payment. The issuer may utilize the PAN data and the account PIN to determine whether to authorize the payment. If the payment instrument is associated with an account with sufficient funds to satisfy the payment, and if the account PIN is the PIN associated with the payment instrument, the issuer may authorize the payment.

At block 442, the issuer may return an authorization response, which may indicate whether the payment instrument is accepted or denied for satisfying the payment. In examples, the authorization response may not include the PAN data and/or the account PIN, but may instead include an indication of payment approval or denial.

At block 444, the payment processing service 106 may send an add-PIN response to the POS application 124. The add-PIN response may be in response to the add-PIN request described above and may indicate that the payment instrument has been approved or denied for satisfying the payment.

At block 446, the POS application 124 may send a complete-bill request to the payment processing service 106. For example, when the issuer has approved use of the payment instrument to satisfy the payment, the POS application 124 may generate the complete-bill request, which indicates that requirements for completing the payment have been met and that the open bill associated with the payment is to be completed. The payment processing service 106 may utilize the complete-bill request to update its system to indicate that a status of the payment is complete.

Figure 5:
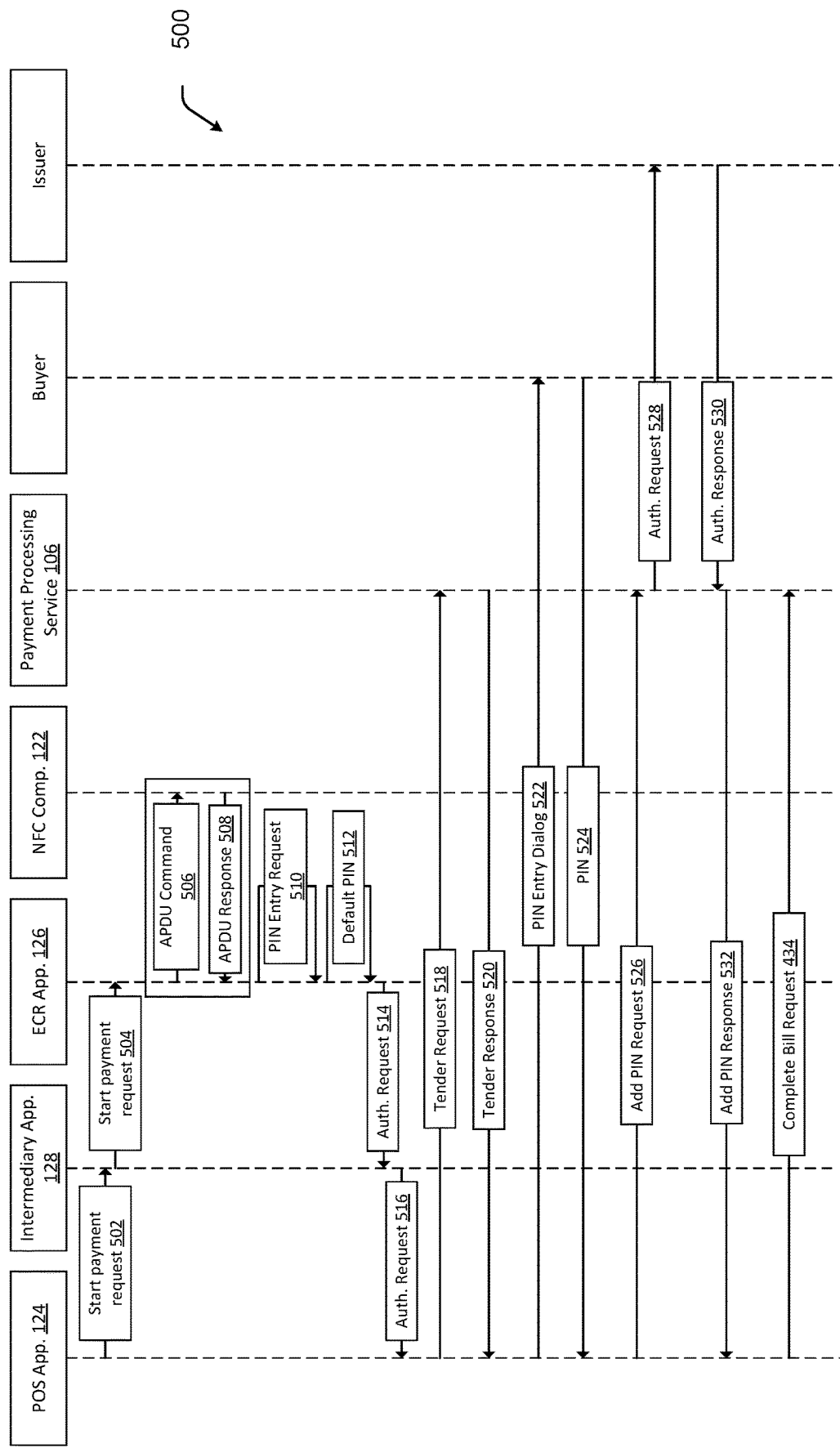
FIG. 5 illustrates an example process associated with securing a payment utilizing an ECR, where an ECR application performs security operations associated with the payment.

FIG. 5 illustrates an example process 500 associated with securing a payment utilizing an ECR, where the ECR application performs security operations associated with the payment. FIG. 5 provides a sequence diagram indicating an example sequence of processes. It should be understood that the sequence provided in FIG. 5 is provided by way of example, not as a limitation, and that some or all of the operations described in FIG. 5 may be performed in a different order and/or in parallel.

At block 502, the POS application 124 may send a start-payment request to an intermediary application 128, which may be described herein as a card reader library. For example, a merchant may add products to a transaction to be purchased by a buyer, and when all of the products the buyer wishes to buy have been added, the merchant may initiate a payment process for satisfying payment for the products. The POS application 124, having received an indication that the payment process is to be initiated, may generate and send the start-payment request to the intermediary application 128. This spatial separation of the ECR application 126 and the POS application 124 may provide for a smaller attack surface for payment kernels and ensures that the ECR application 126 runs outside the POS application 124, which may be the most likely point of attack by a nefarious actor. In these examples, multiple trust applications may be utilized to determine whether the merchant device is still a trusted device at the time of a payment. Additional details on the use of trust applications is provided herein, but generally the trust applications may be utilized to determine whether one or more conditions of the merchant device indicate that the merchant device has been compromised or otherwise is no longer a trusted device for acquiring PAN data and/or PIN data. In examples where the intermediary application 128 is utilized, a trust application may be utilized for determining whether the POS application 124 has been compromised and another trust application may be utilized for determining whether the intermediary application 128 has been compromised. In these examples, the POS application 124 may still perform the default PIN addition processes described above.

At block 504, the intermediary application 128 may send an instance of the start-payment request to the ECR application 126. For example, when a trust routine indicates that the intermediary application 128 has not been compromised, the intermediary application 128 may send the instance of the start-payment request to the ECR application 126.

At block 506, the ECR application 126 may send an APDU command to the NFC component 122. The APDU command may initiate the process of causing a reader to acquire data from a payment instrument. For example, the ECR application 126 may generate and/or utilize a stored APDU command and may send that command to the NFC component 122.

At block 508, the NFC component 122 may send an APDU response to the ECR application 126. The APDU response may include the PAN data as read from the payment instrument. The APDU response may also include other information associated with acquiring data from the payment instrument, such as encryption-related data when encryption is utilized.

At block 510, the ECR application 126 may initiate a PIN entry process within itself and without requesting initiation of such a process by the POS application 124. For example, instead of querying the POS application 124 to initiate the PIN entry process, in the example of FIG. 4, the ECR application 126 may perform the PIN entry process initiation.

At block 512, the ECR application 126 may generate a default PIN. The default PIN may be any numeric, alphabetic, and/or alpha-numeric code that has been predetermined to be a default code to satisfy a requirement that PAN data, when sent to the payment processing service 106, includes a PIN. However, since the PIN is not the actual account PIN associated with the payment instrument, the default PIN cannot be utilized to complete the transaction.

At block 514, the ECR application 126 may send an authorization request to the intermediary application 128. The authorization request may indicate that the data needed to satisfy requirements of the ECR application 126 for proceeding with the payment process have been satisfied.

At block 516, the intermediary application 128 may send an instance of the authorization request to the POS application 124. For example, when a trust routine indicates that the merchant device has not been compromised, the intermediary application 128 may send the instance of the authorization request to the POS application 124. At this point, the POS application 124 may have all the data needed to request authorization for the payment utilizing the payment instrument from the payment processing service 106.

At block 518, the POS application 124 may send a tender request to the payment processing service 106. The tender request may include an identifier of the payment at issue, the PAN data, which may be encrypted in certain examples, and the default PIN. The payment processing service 106 may receive the tender request and identify the included PIN as the default PIN. Based at least in part on the tender request including the default PIN, the payment processing service 106 may determine whether the default PIN that was received corresponds to the predefined default PIN. It should be understood that while one default PIN is described, the default PIN may be dynamic and may change, such as over time and/or based on characteristics of the merchant, buyer, transaction, and/or any other factor associated with the payment. At this point, the POS application 124 may remove the PAN data from the merchant device such that, before the account PIN is provided to the merchant device, the PAN data is not present on the merchant device.

At block 520, the payment processing service 106 may send a tender response to the POS application 124. The tender response may indicate to the POS application 124 that the tender request was received but that the account PIN is still needed.

At block 522, the POS application 124 may cause a PIN entry dialog to be presented to a buyer. In other embodiments where SPoC is utilized, the POS application 124 may query one or more devices, such as a buyer device 104, for the software PIN as described more fully herein. For example, a user interface of the merchant device may display a PIN entry dialog, such as a PIN pad, configured to accept user input corresponding to the account PIN. In the SPoC embodiment, the merchant device may query one or more devices to receive the software PIN, as described more fully herein.

At block 524, user input data representing the account PIN and/or the software PIN may be received at the POS application 124. At this point, the POS application 124 may have stored in association therewith the account PIN and/or software PIN, but not the PAN data given that the PAN data was previously removed from the merchant device as described above.

At block 526, an add-PIN request may be sent to the payment processing service 106. The add-PIN request may include the account PIN and, in examples, an identifier of the payment at issue. At this point, the payment processing service 106 may associate with the account PIN with the PAN data for the payment.

At block 528, the payment processing service 106 may send an authorization request indicating the PAN data and the account PIN to an issuer of the payment instrument utilized to satisfy the payment. The issuer may utilize the PAN data and the account PIN to determine whether to authorize the payment. If the payment instrument is associated with an account with sufficient funds to satisfy the payment, and if the account PIN is the PIN associated with the payment instrument, the issuer may authorize the payment.

At block 530, the issuer may return an authorization response, which may indicate whether the payment instrument is accepted or denied for satisfying the payment. In examples, the authorization response may not include the PAN data and/or the account PIN, but may instead include an indication of payment approval or denial.

At block 532, the payment processing service 106 may send an add-PIN response to the POS application 124. The add-PIN response may be in response to the add-PIN request described above and may indicate that the payment instrument has been approved or denied for satisfying the payment.

At block 534, the POS application 124 may send a complete-bill request to the payment processing service 106. For example, when the issuer has approved use of the payment instrument to satisfy the payment, the POS application 124 may generate the complete-bill request, which indicates that requirements for completing the payment have been met and that the open bill associated with the payment is to be completed. The payment processing service 106 may utilize the complete-bill request to update its system to indicate that a status of the payment is complete.

Figure 6:
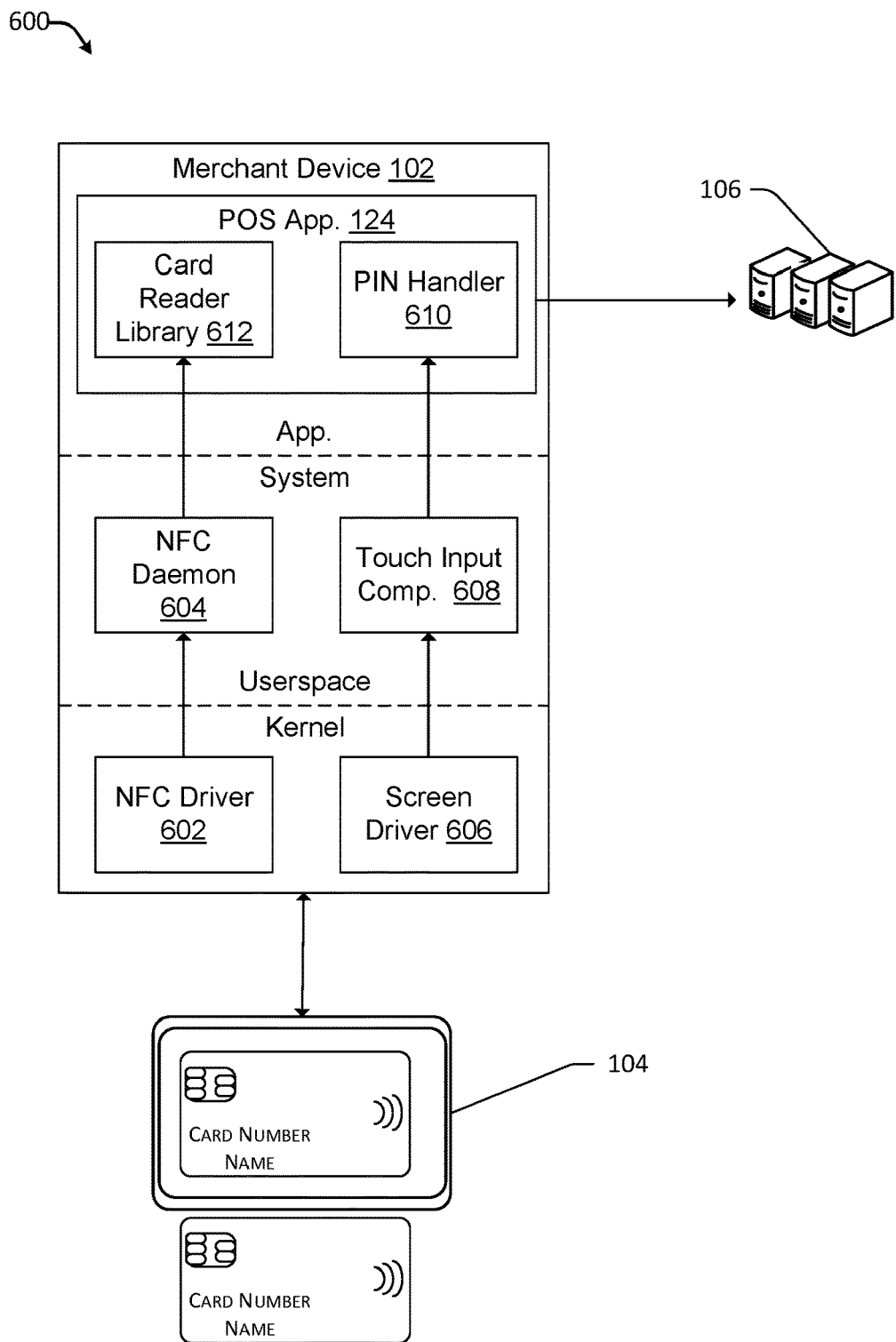
FIG. 6 illustrates a conceptual diagram of example components utilized for securing a payment, where processes associated with acquiring a personal account number (PAN) and a PIN are separated.

FIG. 6 illustrates a conceptual diagram of example components utilized for securing a payment, where processes associated with acquiring a PAN and a PIN are separated. For example, the merchant device 102 depicted in FIG. 6 may be a COTS device to perform transactions. These devices may be utilized to install one or more applications that allow the COTS devices to be utilized for acquiring PAN data and/or other information for satisfying a payment. To do so, a NFC component of a COTS device may be utilized by one or more applications on the device to read PAN data from a payment instrument, and the applications may utilize that PAN data to complete a transaction. In certain examples, COTS devices and other devices may, in addition to acquiring PAN data, may be configured to acquire PIN data to authorize a transaction. The requirement for PIN data may add a layer of security to the transaction, as a nefarious actor would need to not only have acquired the physical payment instrument, but must have also acquired a PIN associated with the payment instrument. Techniques for acquiring PIN data include "PIN-on-glass" techniques where a PIN pad or other user interface is displayed on a merchant device configured to receive user input represent a PIN. Corresponding PIN data is generated on the merchant device and utilized for comparison with reference PIN data associated with the given payment instrument for completing a payment. Additionally, the techniques for acquiring PIN data include SPoC, where a secure reader PIN, a PIN application, the merchant device, as well as backend monitoring and attestation systems are utilized to acquire PIN data.

As shown in FIG. 6, the merchant device 102 may be in communication with a payment instrument and/or a customer device 104, which may store PAN data that may be read by the NFC component of the merchant device 102. In the example of FIG. 6, different components are involved in acquiring the PAN data than the components involved in acquiring the PIN data. For example, an NFC driver 602 may be stored in a kernel component of the merchant device 102 and may communicate with an NFC daemon 604 stored in association with a system user space. The NFC daemon 604 may communicate between the NFC driver 602 and the POS application 124 to acquire the PAN data as described herein. A card reader library payment component 612 of the POS application may be configured to receive the PAN data and utilize the PAN data for payment processing as described herein.

Additionally, a screen driver 606, stored in association with the kernel, may be configured to cause a screen of the merchant device 102 to display input means for acquiring PIN data, such as by displaying a PIN dialog and requesting that a buyer provide user input indicating an account PIN. The screen driver 606 may be configured to communicate with a touch input component 608 in the user space of the system. The touch input component 608 may be configured to request the screen driver 606 to display the PIN entry dialog as described herein. User input data representing the PIN may be sent from the touch input component 608 to a PIN handler 610 of the POS application 124. The PIN handler 610 may be configured to receive the PIN data and provide that PIN data to the payment processing service 106. In these examples, while the POS application 124 may receive both the PAN data and the PIN data, the PAN data may be received at a different component of the POS application 124 than the PIN data. Additionally, in the kernel and system levels of the merchant device 102, the PAN data and the PIN data may not be handled by the same components. This may promote spatial separation between PAN data and PIN data at the merchant device 102.

Figure 7:
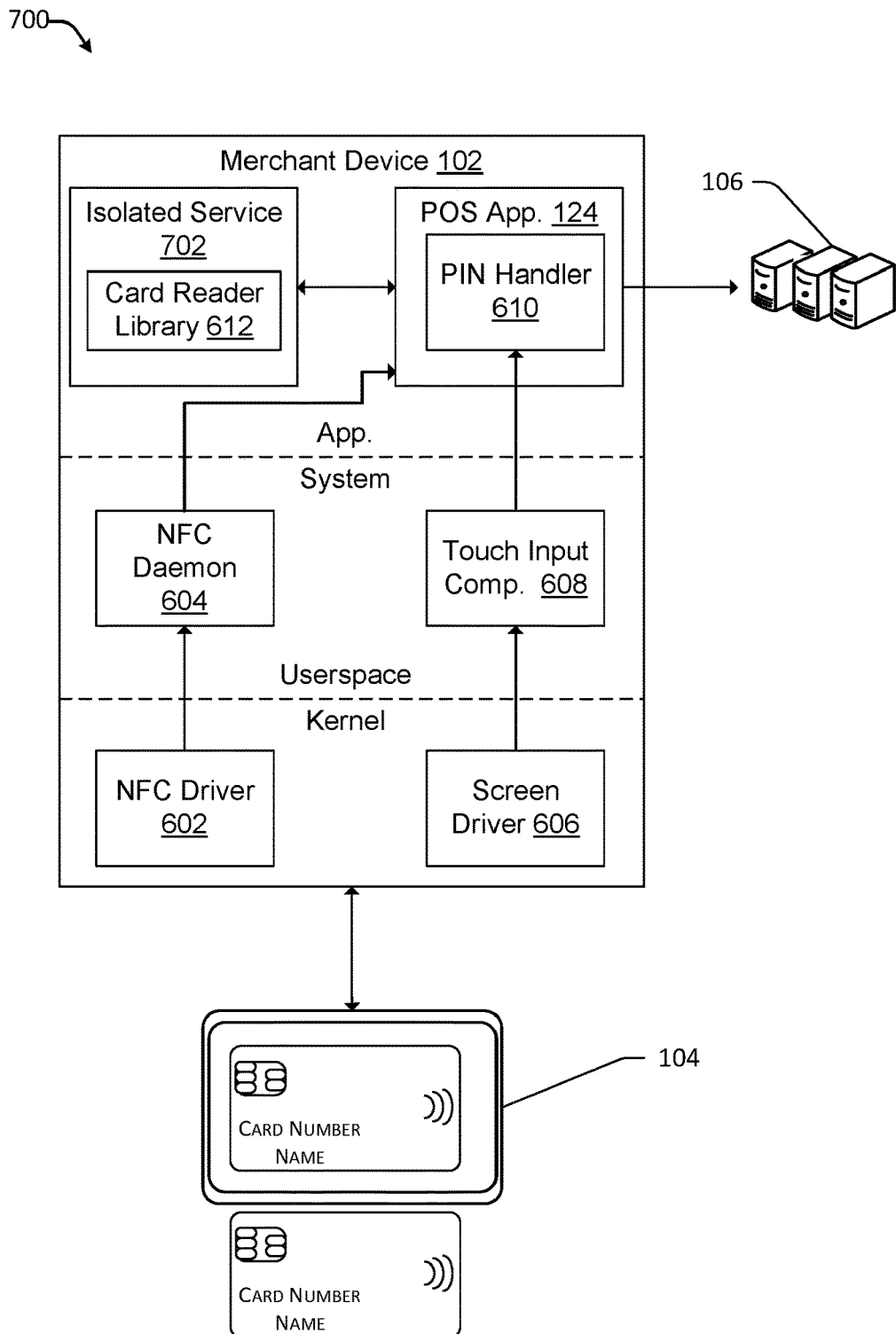
FIG. 7 illustrates a conceptual diagram of example components utilized for securing a payment, where PAN data is handled by an isolated service and the POS application handles PIN data.

FIG. 7 illustrates a conceptual diagram of example components utilized for securing a payment, where PAN data is handled by an isolated service and the POS application handles PIN data. FIG. 7 may include some of the same components as those described in FIG. 6. For example, the merchant device 102 of FIG. 7 may include a NFC driver 602, a NFC daemon 604, a screen driver 606, a touch input component 608, a PIN handler 610, a card reader library payment component 612, and/or a POS application 124. However, as shown in FIG. 7, instead of the POS application 124 including both the card reader library payment component 612 and the PIN handler 610, the POS application 124 may include the PIN handler 610 while an isolated service 702 may include the card reader library payment component 612 and may handle the PAN data.

For example, the merchant device 102 may be in communication with a payment instrument and/or a customer device 104, which may store PAN data that may be read by the NFC component of the merchant device 102. In the example of FIG. 7, different components are involved in acquiring the PAN data than the components involved in acquiring the PIN data. For example, the NFC driver 602 may be stored in a kernel component of the merchant device 102 and may communicate with the NFC daemon 604 stored in association with a system user space. The NFC daemon 604 may communicate between the NFC driver 602 and the POS application 124 to acquire the PAN data as described herein. The card reader library payment component 612 of the isolated service 702 may be configured to receive data from the POS application 124, which may utilize the PAN data for payment processing as described herein. The isolated service 702 may be configured to communicate the PAN data, and/or an encrypted version of the PAN data, to the POS application 124 for sending to the payment processing service 106, and/or for sending to the payment processing service 106 directly from the isolated service 702.

Additionally, the screen driver 606, stored in association with the kernel, may be configured to cause a screen of the merchant device 102 to display input means for acquiring PIN data, such as by displaying a PIN dialog and requesting that a buyer provide user input indicating an account PIN. The screen driver 606 may be configured to communicate with the touch input component 608 in the user space of the system. The touch input component 608 may be configured to request the screen driver 606 to display the PIN entry dialog as described herein. User input data representing the PIN may be sent from the touch input component 608 to the PIN handler 610 of the POS application 124. The PIN handler 610 may be configured to receive the PIN data and provide that PIN data to the payment processing service 106. In these examples, additional separation of PAN data and PIN data may be achieved at the application level of the merchant device 102.

Figure 8:
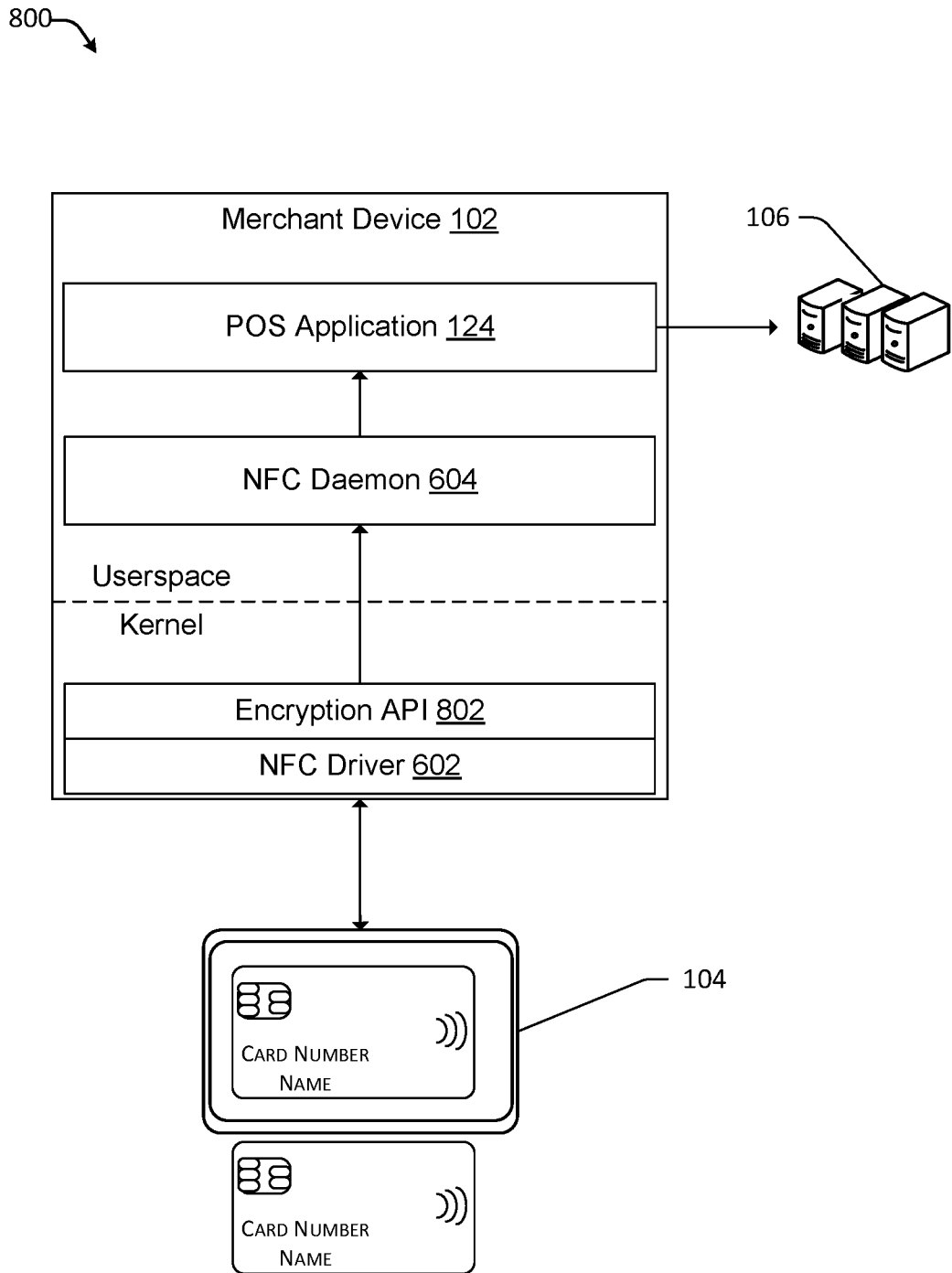
FIG. 8 illustrates a conceptual diagram of example components utilized for securing a payment, where processing of Europay, Mastercard, Visa (EMV) data is handled by a payment processing service instead of a merchant device.

FIG. 8 illustrates a conceptual diagram of example components utilized for securing a payment, where processing of EMV data is handled by a payment processing service instead of a merchant device. FIG. 8 may include some of the same components as those described in FIG. 6. For example, the merchant device 102 of FIG. 8 may include a NFC driver 602, a NFC daemon 604, and/or a POS application 124. However, as shown in FIG. 8, instead of the POS application 124 handling PAN data, EMV data is sent through the POS application 124 to the payment processing service 106 for processing.

For example, the merchant device 102 may be in communication with a payment instrument and/or a customer device 104, which may store PAN data that may be read by the NFC component of the merchant device 102. In the example of FIG. 8, the NFC driver 602 may be stored in a kernel component of the merchant device 102 and may communicate with the NFC daemon 604 stored in association with a user space portion of the system. In the example of FIG. 8, an encryption API 802 may be utilized in the kernel level to encrypt the PAN data received from the NFC driver 602. In other examples, instead of the encryption API 802 being utilized in the kernel level, the encryption may occur in the userspace. The PAN data may be encrypted prior to being sent to the POS application 124. This encrypted data may include encrypted EMV data. In this example, the POS application 124, as well as other components of the merchant device 102, may not have the keys and/or other decryption means to decrypt the EMV data. Instead, the NFC daemon 604 may send the encrypted EMV data to the POS application 124, which may send the encrypted EMV data on to the payment processing service 106. When encryption occurs as described in these examples, encryption keys may be utilized and those encryption keys may be symmetric AES keys that may be generated by and sent from the POS application 124. The POS application 124 may derive the encryption keys from one or more public keys that are sent to the POS application 124 from the payment processing service 106.

The payment processing service 106 may have stored in association therewith the security keys and/or otherwise the decryption means to decrypt the EMV data as received from the merchant device 102. In these examples, the payment processing service 106 may decrypt the EMV data to identify the PAN data. Additional security processes, such as acquisition of PIN data and/or comparison of that PIN data with a reference PIN associated with the payment instrument may be performed, and the payment processing service 106 may determine whether use of the payment instrument to satisfy the payment at issue is authorized. When authorized, the payment processing service 106 may send an indication of the authorization to the POS application 124, which may complete the transaction based at least in part on receiving the indication.

Figure 9:
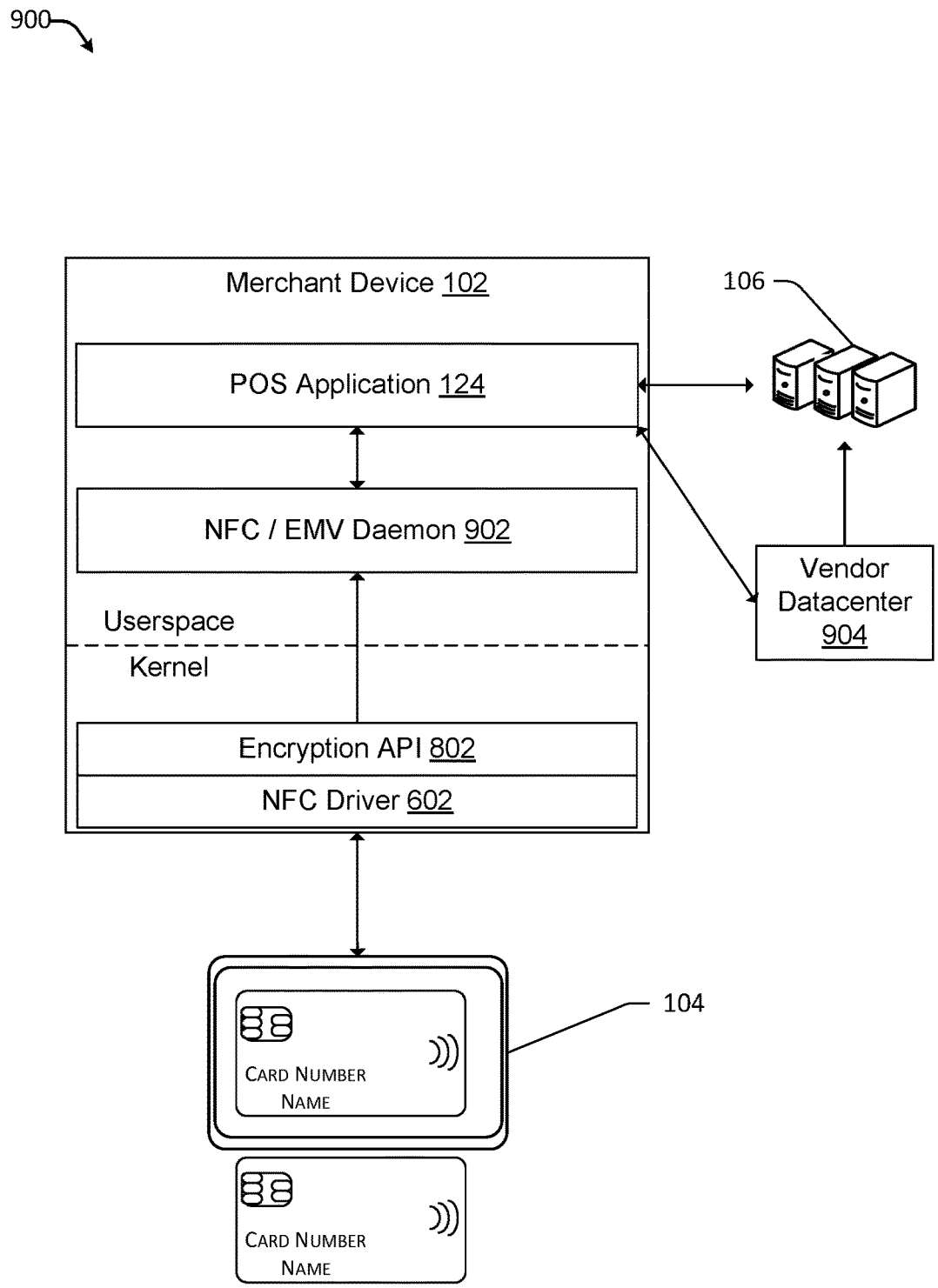
FIG. 9 illustrates a conceptual diagram of example components utilized for securing a payment, where processing of EMV data is handled by a vendor datacenter.

FIG. 9 illustrates a conceptual diagram of example component utilized for securing a payment, where processing of EMV data is handled by a vendor datacenter. FIG. 9 may include some of the same components as those described in FIG. 6. For example, the merchant device 102 of FIG. 9 may include a NFC driver 602 and/or a POS application 124. However, as shown in FIG. 9, instead of the POS application 124 handling PAN data, EMV data is sent to a vendor datacenter 904 for processing.

For example, the merchant device 102 may be in communication with a payment instrument and/or a customer device 104, which may store PAN data that may be read by the NFC component of the merchant device 102. In the example of FIG. 9, the NFC driver 602 may be stored in a kernel component of the merchant device 102 and may communicate with an NFC EMV daemon 902 stored in association with a user space portion of the system. In the example of FIG. 9, an encryption API 802 may be utilized in the kernel level to encrypt the PAN data received from the NFC driver 602. This encrypted data may include encrypted EMV data. In other examples, instead of the encryption API 802 being utilized in the kernel level, the encryption may occur in the userspace. The PAN data may be encrypted prior to being sent to the POS application 124. In these examples, the POS application 124, as well as other components of the merchant device 102, may not have the keys and/or other decryption means to decrypt the EMV data. Instead, the NFC EMV daemon 902 may send the encrypted EMV data to the vendor datacenter 904. The vendor datacenter 904 may be associated with an OEM of the merchant device 102.

The vendor datacenter 904 may have stored in association therewith the security keys and/or otherwise the decryption means to decrypt the EMV data as received from the merchant device 102. In these examples, the vendor datacenter 904 may decrypt the EMV data to identify the PAN data. The vendor datacenter 904 may send the PAN data and/or an indication of a payment state (e.g., PAN data acquired), to the payment processing service 106 for further processing. The vendor datacenter 904, the POS application 124, and/or the payment processing service 106 may communicate payment states with each other such that the PAN data is handled primarily by the vendor datacenter 904 while the POS application 124 and the payment processing service 106 receive appropriate authorization indications to proceed with the transaction.

Figure 10:
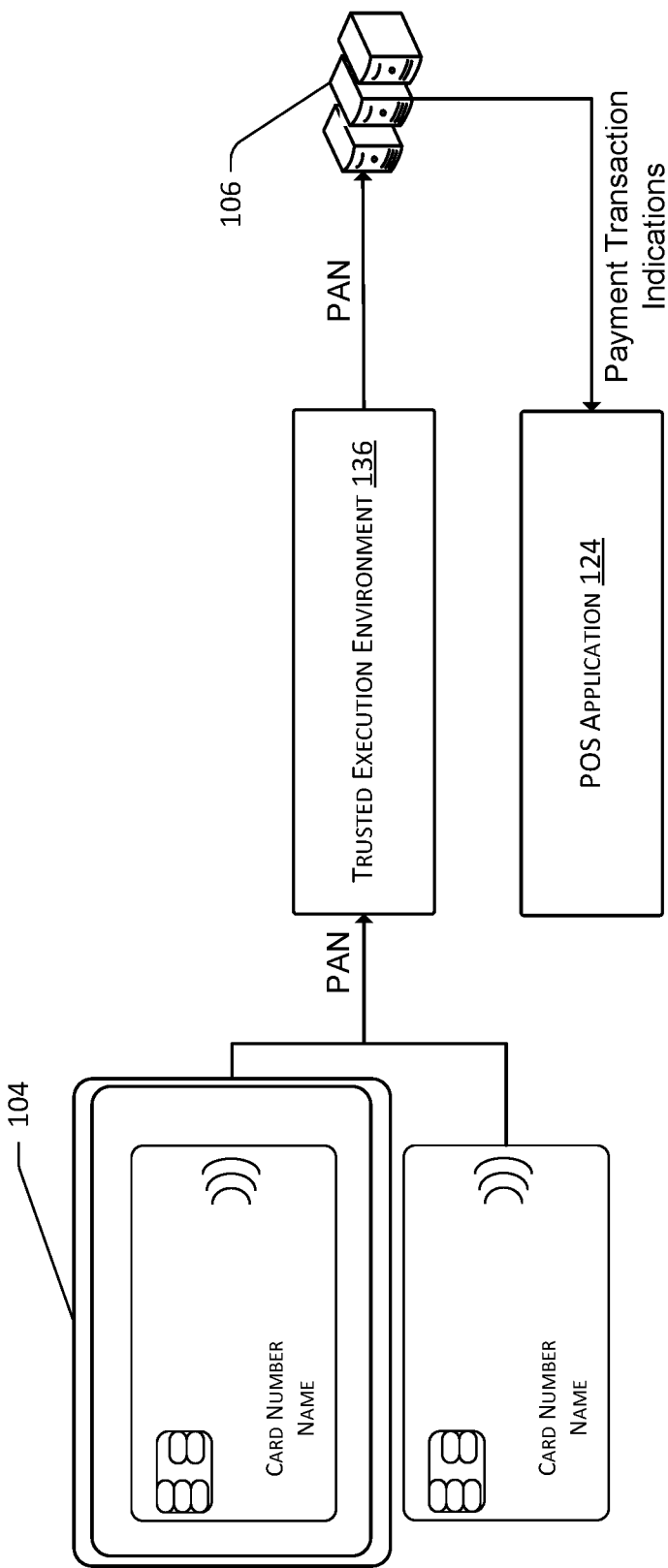
FIG. 10 illustrates a conceptual diagram of example components utilized for securing a payment utilizing a trusted execution environment (TEE).

FIG. 10 illustrates a conceptual diagram of example components utilized for securing a payment utilizing a TEE. The environment of FIG. 10 may include some of the same components described with respect to FIG. 1, including, for example, a customer device 104 and/or a customer payment instrument, a POS application 124, a TEE 136, and/or a payment processing service 106. FIG. 10 depicts the use of a TEE 136 to promote ECR security as described herein. For example, the TEE 136 may be utilized to enhance ECR security on COTS devices. For example, when PAN data is read by an NFC component of the COTS device, the PAN data may be sent to the TEE 136, which may be isolated from other components of the COTS device. The TEE 136 may provide more security than the POS application 124 in restricting access to the TEE 136 without proper authorization. In this example, the TEE 136 may communicate with the payment processing service 106 to send the PAN data and/or an encrypted version of the PAN data. The payment processing service 106 may utilize this data to determine whether a payment is authorized, and payment transaction indications may be sent from the payment processing service 106 to the POS application 124, such as to indicate whether a payment is authorized. In this way, the POS application 124 may not have access to the PAN data but instead may progress through a transaction based at least in part on indications received from the payment processing service 106.

By performing one or more of the techniques described herein, spatial and/or temporal separation of PAN data from other data utilized for a transaction, such as PIN data, promotes security of the transaction and makes unauthorized access to all information needed to nefariously utilize the payment instrument difficult to obtain. These techniques are specific to the computer-centric problem of handling digital transactions on COTS devices where such devices may be compromised and unauthorized access may occur. These techniques are also specific to computer-centric solutions that utilize specifically-configured applications, application arrangements, encryption/decryption schemes, TEEs, and other components that could not be performed by a human being, whether as a mental process or through physical means. This added security is also implemented in a time-sensitive manner between when a transaction is initiated and when that transaction is completed (i.e., a matter of seconds), minimizing latency in the payment process.

FIGS. 11-14 illustrate processes for embedded card reader security. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS.

1A-10, 15, and 16, although the processes may be implemented in a wide variety of other environments, architectures and systems.

Figure 11:
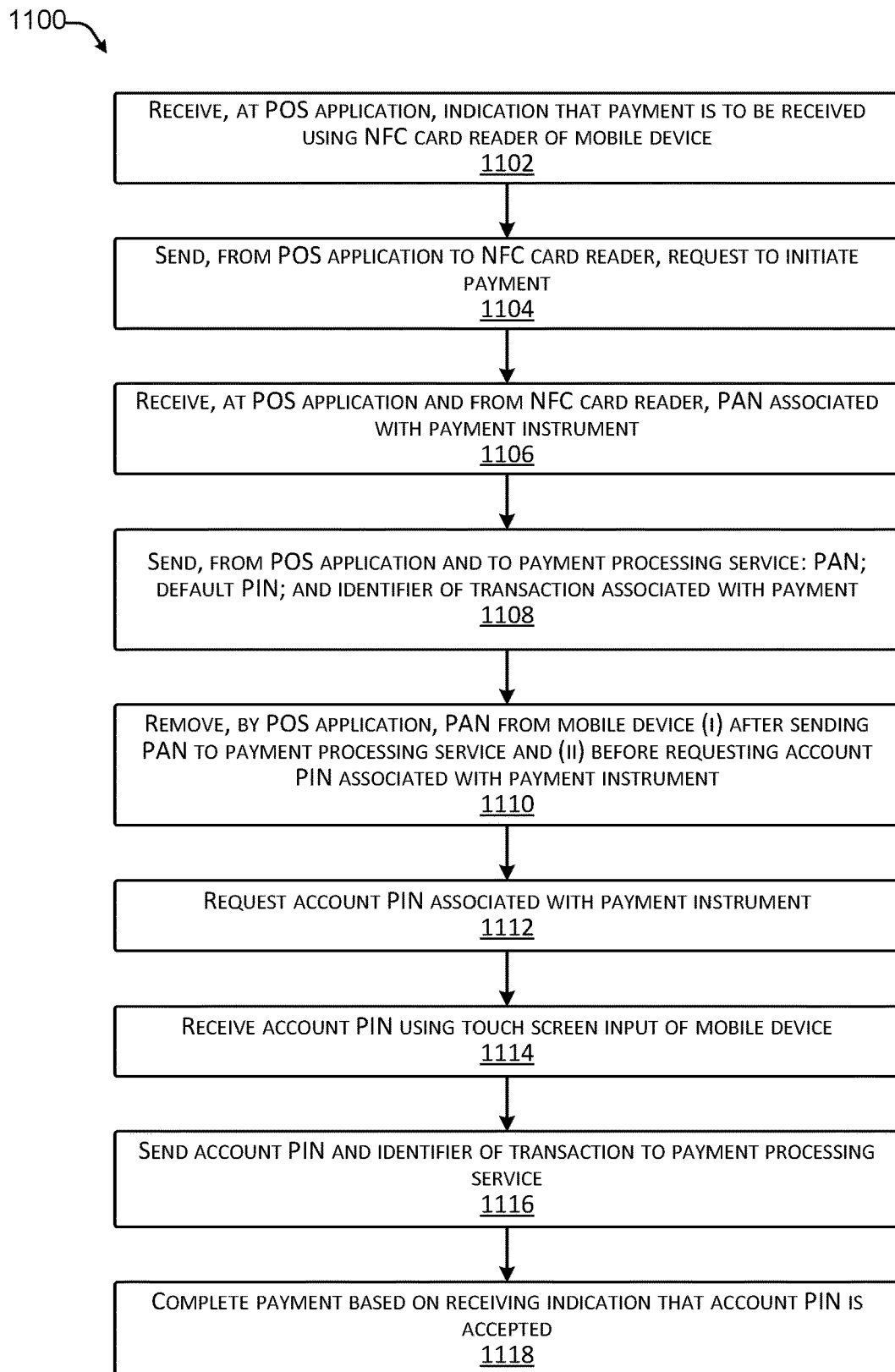
FIG. 11 illustrates an example process for ECR security.

FIG. 11 illustrates an example process 1100 for ECR security. The order in which the operations or steps are described is not intended to be construed as a limitation, and any number of the described operations may be combined in any order and/or in parallel to implement process 1100.

At block 1102, the process 1100 may include receiving, at the POS application, an indication that a payment is to be received using a NFC reader of the mobile device. For example, a merchant may add products to a transaction to be purchased by a buyer, and when all of the products the buyer wishes to buy have been added, the merchant may initiate a payment process for satisfying payment for the products. The POS application may receive an indication that the merchant has initiated the payment process for satisfying the payment for the products.

At block 1104, the process 1100 may include sending, from the POS application to the NFC reader, a request to initiate the payment. For example, an ECR may send an APDU command to the POS application. The APDU command may initiate the process of causing a reader to acquire data from a payment instrument. For example, the ECR may generate and/or utilize a stored APDU command and may send that command to the POS application such that the POS application and the NFC component may communicate directly to acquire a PAN associated with the buyer's payment instrument. The POS application may send an instance of the APDU command to the NFC component. Sending of the APDU command to the NFC component may cause the NFC component to initiate and/or to read PAN data from a payment instrument and/or to send read PAN data to one or more components of the merchant device.

At block 1106, the process 1100 may include receiving, at the POS application and from the NFC reader, a PAN associated with a payment instrument. The NFC component may send an APDU response to the POS application. The APDU response may include the PAN data as read from the payment instrument. The APDU response may also include other information associated with acquiring data from the payment instrument, such as encryption-related data when encryption is utilized. The POS application may send the APDU response and/or an indication of the APDU response to the ECR. For example, the POS application may indicate to the ECR that responsive data has been received from the NFC component and that the payment processing is to proceed.

At block 1108, the process 1100 may include sending, from the POS application and to a payment processing service: the PAN; a default PIN; and an identifier of a transaction associated with the payment. For example, the POS application may send a default PIN to the ECR. The default PIN may be any numeric, alphabetic, and/or alphanumeric code that has been predetermined to be a default code to satisfy a requirement that PAN data, when sent to the payment processing service, includes a PIN. However, since the PIN is not the actual account PIN associated with the payment instrument, the default PIN cannot be utilized to complete the transaction. The ECR may send an authorization request to the POS application. At this point, the POS application may have all the data needed to request authorization for the payment utilizing the payment instrument from the payment processing service. Additionally, the data needed to satisfy requirements of the ECR for proceeding with the payment process may also been satisfied. The POS application may send a tender request to the payment processing service. The tender request may include an identifier of the payment at issue, the PAN data, which may be encrypted in certain examples, and the default PIN. The payment processing service may receive the tender request and identify the included PIN as the default PIN. Based at least in part on the tender request including the default PIN, the payment processing service may determine whether the default PIN that was received corresponds to the predefined default PIN. It should be understood that while one default PIN is described, the default PIN may be dynamic and may change, such as over time and/or based on characteristics of the merchant, buyer, transaction, and/or any other factor associated with the payment.

At block 1110, the process 1100 may include removing, by the POS application, the PAN from the mobile device (i) after sending the PAN to the payment processing service and (ii) before requesting an account PIN associated with the payment instrument. For example, the promote temporal separation of the PAN and PIN on the merchant device, the PAN may be removed from the POS application and/or from the merchant device in total.

At block 1112, the process 1100 may include requesting the account PIN associated with the payment instrument. For example, the POS application may cause a PIN entry dialog to be presented to a buyer. In other embodiments where SPoC is utilized, the POS application may query one or more devices, such as a buyer device, for the software PIN as described more fully herein. For example, a user interface of the merchant device may display a PIN entry dialog, such as a PIN pad, configured to accept user input corresponding to the account PIN. In the SPoC embodiment, the merchant device may query one or more devices to receive the software PIN, as described more fully herein.

At block 1114, the process 1100 may include receiving the account PIN using a touch screen input of the mobile device. For example, user input data representing the account PIN and/or the software PIN may be received at the POS application. At this point, the POS application may have stored in association therewith the account PIN and/or software PIN, but not the PAN data given that the PAN data was previously removed from the merchant device as described above.

At block 1116, the process 1100 may include sending the account PIN and the identifier of the transaction to the payment processing service. For example, the POS application may send the account PIN, whether in an encrypted format or not, to the payment processing service is response to the payment processing service requesting the account PIN.

At block 1118, the process 1100 may include completing the payment based on receiving an indication that the account PIN is accepted. For example, the payment processing service may provide an indication that the provided account PIN corresponds to an account PIN associated with the payment instrument and that the payment instrument is otherwise authorized to satisfy the payment.

Additionally, or alternatively, the process 1100 may include sending the request from the POS application to an intermediary application configured to communicate with the POS application and the NFC reader. The process 1100 may also include receiving the PAN, at the POS application, from the intermediary application.

Additionally, or alternatively, the process 1100 may include receiving, at the POS application and from the NFC reader, EMV data associated with the payment instrument, the EMV data being unencrypted by the NFC reader. The process 1100 may also include determining, by the POS application, the PAN utilizing the EMV data.

Additionally, or alternatively, the process 1100 may include receiving, at the POS application and from the NFC reader, EMV data associated with the payment instrument, the EMV data being encrypted by the NFC reader. The process 1100 may also include decrypting, by the POS application, the EMV data such that decrypted EMV data is generated. The process 1100 may also include determining, by the POS application, the PAN utilizing the decrypted EMV data.

Additionally, or alternatively, the process 1100 may include the PAN, when received at the POS application, being encrypted as EMV data, and sending the EMV data to the payment processing service. The process 1100 may also include completing the payment based at least in part on the PAN, as decrypted at the payment processing service, and the account PIN being accepted.

Additionally, or alternatively, the process 1100 may include the PAN being encrypted as EMV data configured to be decrypted by an OEM associated with the device. The process 1100 may also include sending the EMV data to the OEM with a request to decrypt the EMV data and provide the PAN to the payment processing service. The process 1100 may also include completing the payment based at least in part on the PAN, as decrypted as the OEM, and the account PIN being accepted.

Additionally, or alternatively, the process 1100 may include receiving, at a TEE, EMV data including an encrypted version of the PAN. The process 1100 may also include decrypting, at the TEE, the EMV data such that the PAN is identified. In these examples, completing the payment may comprise completing the payment utilizing the PAN as decrypted in the TEE.

Additionally, or alternatively, the process 1100 may include causing, prior to receiving the PAN, a trust routine to be performed in association with the device, the trust routine configured to determine whether the device has been tampered with in a manner indicating the device is unsecure for completing the payment. The process 1100 may also include determining that the trust routine indicates the device has not been tampered with. The process 1100 may also include requesting, by the POS application, the PAN in response to the trust routine indicating the device has not been tampered with.

Figure 12:
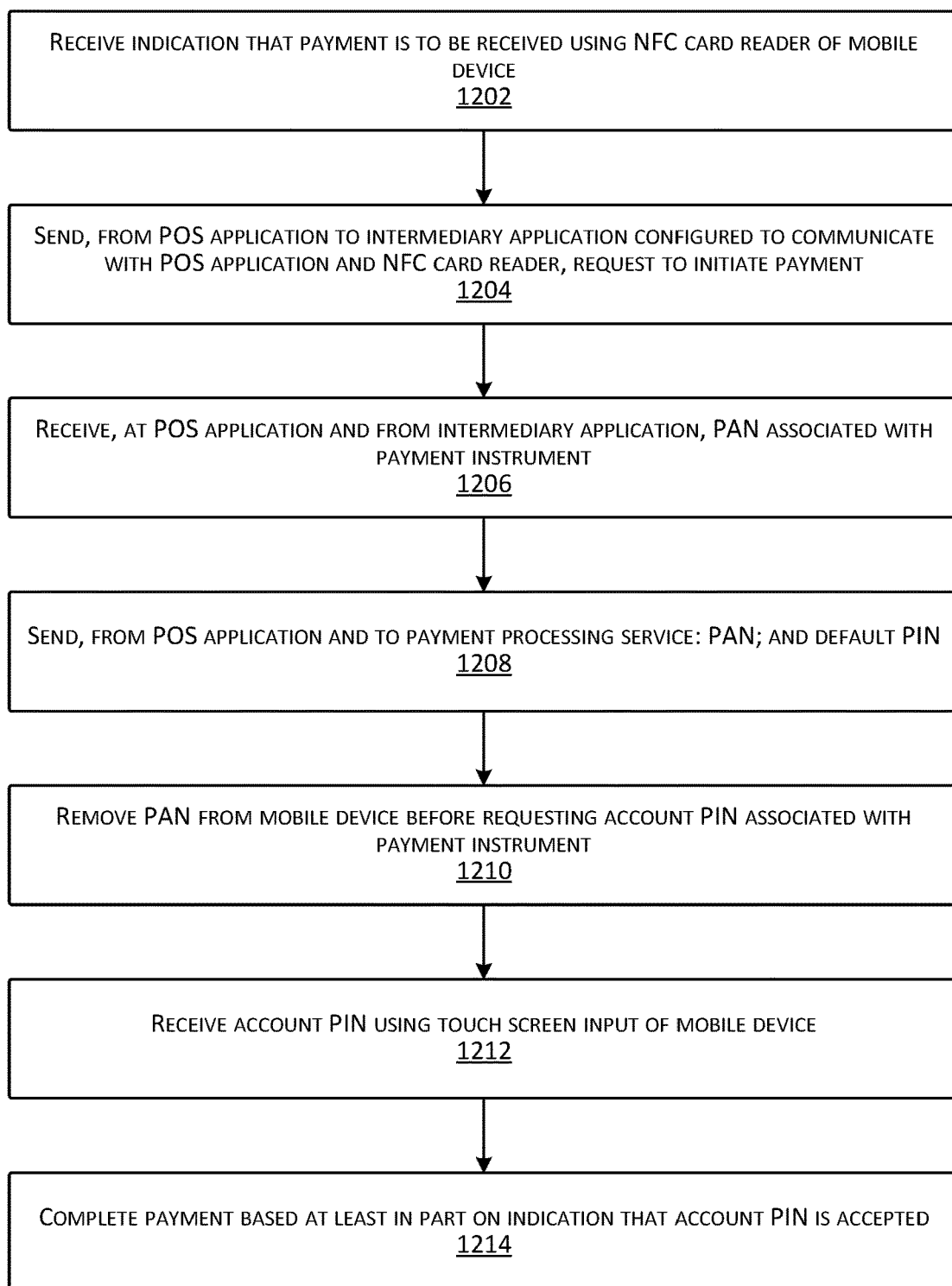
FIG. 12 illustrates another example process for ECR security.

FIG. 12 illustrates another example process 1200 for ECR security. The order in which the operations or steps are described is not intended to be construed as a limitation, and any number of the described operations may be combined in any order and/or in parallel to implement process 1200.

At block 1202, the process 1200 may include receiving an indication that a payment is to be received using a NFC reader of the mobile device. For example, a merchant may add products to a transaction to be purchased by a buyer, and when all of the products the buyer wishes to buy have been added, the merchant may initiate a payment process for satisfying payment for the products. The POS application may receive an indication that the merchant has initiated the payment process for satisfying the payment for the products.

At block 1204, the process 1200 may include sending, from the POS application to an intermediary application configured to communicate with the POS application and the NFC reader, a request to initiate the payment. For example, the intermediary application may send an instance of the start-payment request to the ECR. For example, when a trust routine indicates that the intermediary application has not been compromised, the intermediary application may send the instance of the start-payment request to the ECR. The ECR may send an APDU command to the intermediary application. The APDU command may initiate the process of causing a reader to acquire data from a payment instrument. For example, the ECR may generate and/or utilize a stored APDU command and may send that command to the intermediary application to be sent to the POS application. The intermediary application may send an instance of the APDU command to the POS application. For example, when a trust routine indicates that the intermediary application has not been compromised, the intermediary application may send the instance of the APDU command to the POS application. The POS application may send an APDU command to the NFC component. Sending of the APDU command to the NFC component may cause the NFC component to initiate and/or to read PAN data from a payment instrument and/or to send read PAN data to one or more components of the merchant device.

At block 1206, the process 1200 may include receiving, at the POS application and from the intermediary application, a PAN associated with a payment instrument. For example, the NFC component may send an APDU response to the POS application. The APDU response may include the PAN data as read from the payment instrument. The APDU response may also include other information associated with acquiring data from the payment instrument, such as encryption-related data when encryption is utilized.

At block 1208, the process 1200 may include sending, from the POS application and to a payment processing service: the PAN; and a default PIN. For example, the POS application may send a default PIN to the ECR. The default PIN may be any numeric, alphabetic, and/or alpha-numeric code that has been predetermined to be a default code to satisfy a requirement that PAN data, when sent to the payment processing service, includes a PIN. However, since the PIN is not the actual account PIN associated with the payment instrument, the default PIN cannot be utilized to complete the transaction. The ECR may send an authorization request to the POS application. At this point, the POS application may have all the data needed to request authorization for the payment utilizing the payment instrument from the payment processing service. Additionally, the data needed to satisfy requirements of the ECR for proceeding with the payment process may also been satisfied. The POS application may send a tender request to the payment processing service. The tender request may include an identifier of the payment at issue, the PAN data, which may be encrypted in certain examples, and the default PIN. The payment processing service may receive the tender request and identify the included PIN as the default PIN. Based at least in part on the tender request including the default PIN, the payment processing service may determine whether the default PIN that was received corresponds to the predefined default PIN. It should be understood that while one default PIN is described, the default PIN may be dynamic and may change, such as over time and/or based on characteristics of the merchant, buyer, transaction, and/or any other factor associated with the payment.

At block 1210, the process 1200 may include removing the PAN from the mobile device before requesting an account PIN associated with the payment instrument. For example, the promote temporal separation of the PAN and PIN on the merchant device, the PAN may be removed from the POS application and/or from the merchant device in total.

At block 1212, the process 1200 may include receiving the account PIN using a touch screen input of the mobile device. For example, user input data representing the account PIN and/or the software PIN may be received at the POS application. At this point, the POS application may have stored in association therewith the account PIN and/or software PIN, but not the PAN data given that the PAN data was previously removed from the merchant device as described above.

At block 1214, the process 1200 may include completing the payment based at least in part on an indication that the account PIN is accepted. For example, the payment processing service may provide an indication that the provided account PIN corresponds to an account PIN associated with the payment instrument and that the payment instrument is otherwise authorized to satisfy the payment.

Additionally, or alternatively, the process 1200 may include the PAN, when received at the POS application, being encrypted as EMV data. The process 1200 may also include sending the EMV data to the payment processing service. The process 1200 may also include completing the payment based at least in part on the PAN, as decrypted at the payment processing service, and the account PIN being accepted.

Additionally, or alternatively, the process 1200 may include the PAN being encrypted as EMV data configured to be decrypted by an OEM associated with the device. The process 1200 may also include sending the EMV data to the OEM with a request to decrypt the EMV data and provide the PAN to the payment processing service. The process 1200 may also include completing the payment based at least in part on the PAN, as decrypted as the OEM, and the account PIN being accepted.

Additionally, or alternatively, the process 1200 may include receiving, at a TEE of the mobile device, EMV data including an encrypted version of the PAN. The process 1200 may also include decrypting, at the TEE, the EMV data such that the PAN is identified. In these examples, completing the payment may be performed utilizing the PAN as decrypted in the TEE.

Additionally, or alternatively, the process 1200 may include causing, prior to receiving the PAN, a trust routine to be performed in association with the mobile device, the trust routine configured to determine whether the mobile device has been tampered with. The process 1200 may also include determining that the trust routine indicates the mobile device has not been tampered with. The process 1200 may also include requesting, by the POS application, the PAN in response to the trust routine indicating the mobile device has not been tampered with.

Additionally, or alternatively, the process 1200 may include sending the request to initiate the payment from the POS application to the intermediary application causes an embedded card reader application to query the NFC reader for the PAN. The process 1200 may also include receiving the PAN from the intermediary application comprises the intermediary application receiving the PAN from the embedded card reader application and sending the PAN to the POS application.

Additionally, or alternatively, the process 1200 may include receiving, at the POS application and from the NFC reader, EMV data associated with the payment instrument, the EMV data being unencrypted by the NFC reader. The process 1200 may also include determining, by the POS application, the PAN utilizing the EMV data.

Additionally, or alternatively, the process 1200 may include receiving, at the POS application and from the NFC reader, EMV data associated with the payment instrument, the EMV data being encrypted by the NFC reader. The process 1200 may also include decrypting, by the POS application, the EMV data such that decrypted EMV data is generated. The process 1200 may also include determining, by the POS application, the PAN utilizing the decrypted EMV data.

Figure 13:
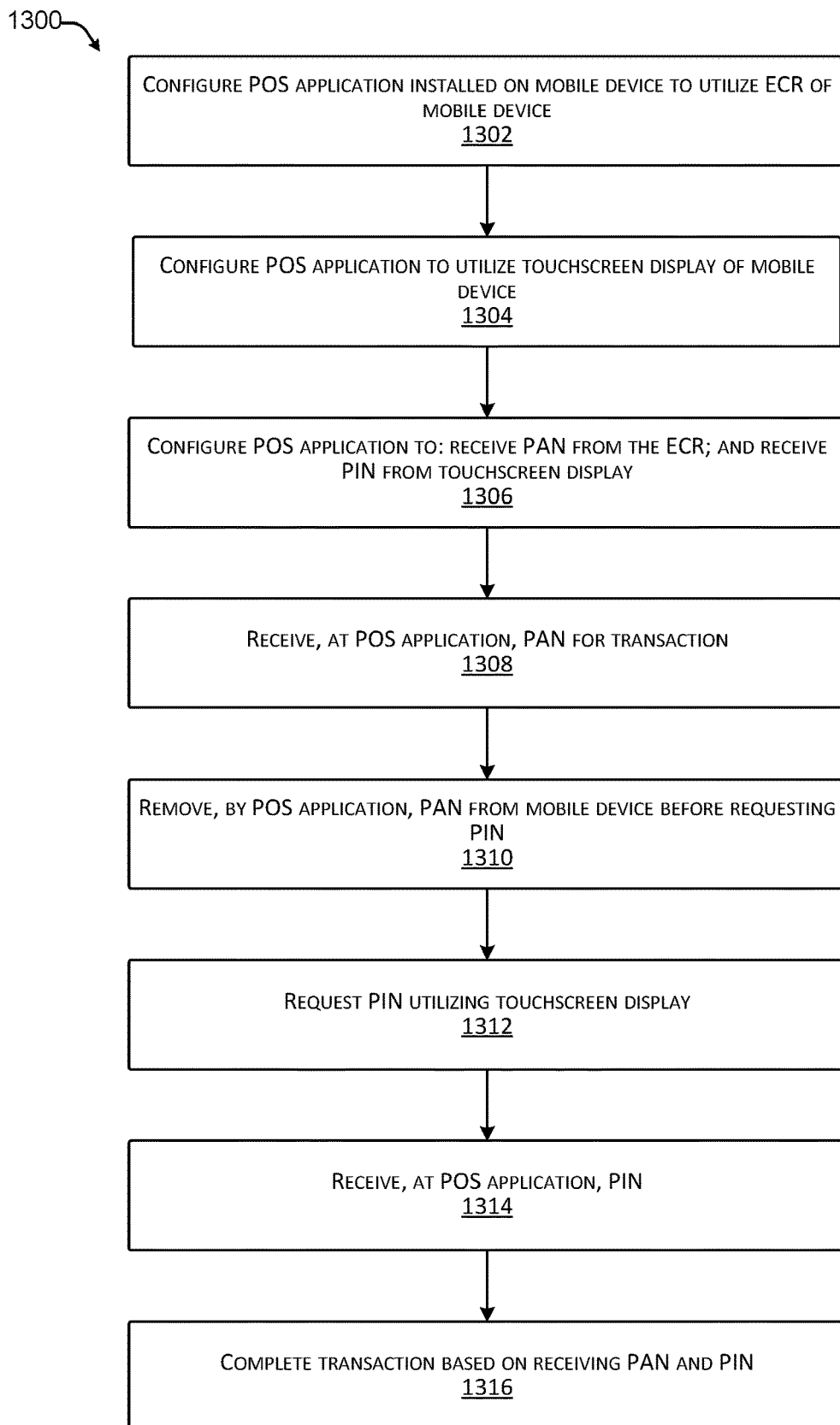
FIG. 13 illustrates an example process for temporally separating PAN data and PIN data on a merchant device to assist in ECR security.

FIG. 13 illustrates an example process 1300 for temporally separating PAN data and PIN data on a merchant device to assist in ECR security. The order in which the operations or steps are described is not intended to be construed as a limitation, and any number of the described operations may be combined in any order and/or in parallel to implement process 1300.

At block 1302, the process 1300 may include configuring a point of sale (POS) application installed on a mobile device to utilize an embedded card reader (ECR) of the mobile device. For example, some merchants do not utilize specific POS devices to handle transactions, instead opting for utilizing COTS device to perform transactions. Example COTS devices include a typical mobile device, such as cellphone, a tablet, etc. These devices may be utilized to install one or more applications that allow the COTS devices to be utilized for acquiring PAN data and/or other information for satisfying a payment. To do so, a NFC component of a COTS device may be utilized by one or more applications on the device to read PAN data from a payment instrument, and the applications may utilize that PAN data to complete a transaction. In certain examples, COTS devices and other devices may, in addition to acquiring PAN data, may be configured to acquire PIN data to authorize a transaction. The requirement for PIN data may add a layer of security to the transaction, as a nefarious actor would need to not only have acquired the physical payment instrument, but must have also acquired a PIN associated with the payment instrument. Techniques for acquiring PIN data include "PIN-on-glass" techniques where a PIN pad or other user interface is displayed on a merchant device configured to receive user input represent a PIN. Corresponding PIN data is generated on the merchant device and utilized for comparison with reference PIN data associated with the given payment instrument for completing a payment. Additionally, the techniques for acquiring PIN data include SPoC, where a secure reader PIN, a PIN application, the merchant device, as well as backend monitoring and attestation systems are utilized to acquire PIN data.

At block 1304, the process 1300 may include configuring the POS application to utilize a touchscreen display of the mobile device. For example, the POS application may be configured such that, when user input is requested, the POS application requests that user input via the touchscreen display of the mobile device.

At block 1306, the process 1300 may include configuring the POS application to: receive a PAN from the ECR; and receive a PIN from the touchscreen display. For example, the POS application may be configured to communicate with the NFC component of the mobile device to read and acquire PAN data from a payment instrument. Also, routines for acquiring PIN data via SPoC techniques may be enabled to allow the mobile device to communicate with a customer device and/or another device to receive a software PIN.

At block 1308, the process 1300 may include receiving, at the POS application, the PAN for a transaction. For example, an APDU command may initiate the process of causing a reader to acquire data from a payment instrument. The POS application may send an instance of the APDU command to the NFC component. Sending of the APDU command to the NFC component may cause the NFC component to initiate and/or to read PAN data from a payment instrument and/or to send read PAN data to one or more components of the merchant device.

At block 1310, the process 1300 may include removing, by the POS application, the PAN from the mobile device before requesting the PIN. For example, the promote temporal separation of the PAN and PIN on the merchant device, the PAN may be removed from the POS application and/or from the merchant device in total.

At block 1312, the process 1300 may include requesting the PIN utilizing the touchscreen display. For example, a software PIN may be acquired from a customer device and/or one or more other devices. The process for acquiring a software PIN may include, for example, the monitoring and/or management of platform security status, ensuring PIN security requirements, attestation procedures, and/or key management procedures.

At block 1314, the process 1300 may include receiving, at the POS application, the PIN. For example, the touchscreen display may be utilized to receive user input representing the PIN, and PIN data may be received at the POS application.

At block 1316, the process 1300 may include completing the payment based on receiving an indication that the account PIN is accepted. For example, the payment processing service may provide an indication that the provided account PIN corresponds to an account PIN associated with the payment instrument and that the payment instrument is otherwise authorized to satisfy the payment.

Additionally, or alternatively, the process 1300 may include sending the PAN to a payment processing service. In these examples, removing the PAN from the mobile device may be in response to sending the PAN to the payment processing service.

Additionally, or alternatively, the process 1300 may include receiving, from a payment processing service, a request for the PIN. In these examples, removing the PAN from the mobile device may be in response to receiving the request for the PIN.

Additionally, or alternatively, the process 1300 may include requesting the account PIN in response to removing the PAN from the mobile device.

Additionally, or alternatively, the process 1300 may include causing, after receiving the PAN, a trust routine to be performed in association with the mobile device, the trust routine configured to determine whether the mobile device has been tampered with. The process 1300 may also include determining that the trust routine indicates the mobile device has not been tampered with. In these examples, requesting the account PIN may be in response to the trust routine indicating the mobile device has not been tampered with.

Additionally, or alternatively, the process 1300 may include receiving the PAN at a TEE of the mobile device. The process 1300 may also include the account PIN being received outside the TEE of the mobile device.

Additionally, or alternatively, the process 1200 may include, in response to requesting the account PIN, receiving an indication that user input is received that corresponds to the account PIN. In these examples, completing the payment may be based at least in part on the indication.

Additionally, or alternatively, the process 1300 may include sending the encrypted first data to the payment processing service. The process 1300 may also include receiving encrypted second data representing the account PIN. The process 1300 may also include sending the encrypted second data to the payment processing service.

Additionally, or alternatively, the process 1300 may include receiving encrypted data representing the account PIN. The process 1300 may also include sending the encrypted data to a payment processing system. The process 1300 may also include receiving, from the payment processing system, an indication that the account PIN, as decrypted by the payment processing system, is authorized in association with the PAN. In these examples, completing the payment may be based at least in part on the account PIN being authorized in association with the PAN.

Additionally, or alternatively, the process 1300 may include receiving the account PIN at a second application configured to prevent communication between the second application and the first application. The process 1300 may also include sending the PAN from the first application to a payment processing service. These process 1300 may also include sending the account PIN from the second application to the payment processing service.

Figure 14:
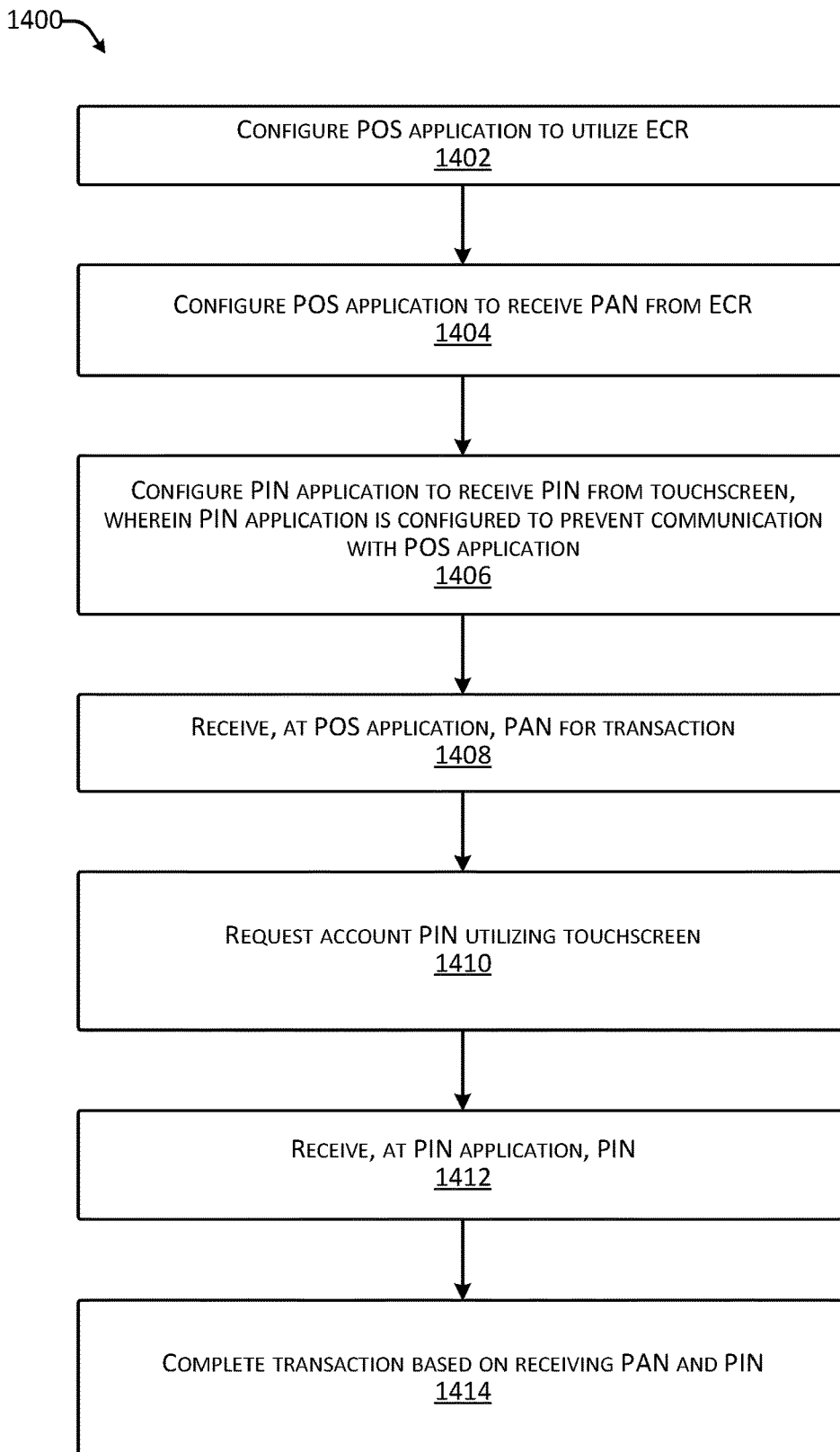
FIG. 14 illustrates an example process for spatially separating PAN data and PIN data on a merchant device to assist in ECR security.

FIG. 14 illustrates an example process 1400 for spatially separating PAN data and PIN data on a merchant device to assist in ECR security. The order in which the operations or steps are described is not intended to be construed as a limitation, and any number of the described operations may be combined in any order and/or in parallel to implement process 1400.

At block 1402, the process 1400 may include configuring a POS application to utilize an ECR. For example, some merchants do not utilize specific POS devices to handle transactions, instead opting for utilizing COTS device to perform transactions. Example COTS devices include a typical mobile device, such as cellphone, a tablet, etc. These devices may be utilized to install one or more applications that allow the COTS devices to be utilized for acquiring PAN data and/or other information for satisfying a payment. To do so, a NFC component of a COTS device may be utilized by one or more applications on the device to read PAN data from a payment instrument, and the applications may utilize that PAN data to complete a transaction. In certain examples, COTS devices and other devices may, in addition to acquiring PAN data, may be configured to acquire PIN data to authorize a transaction. The requirement for PIN data may add a layer of security to the transaction, as a nefarious actor would need to not only have acquired the physical payment instrument, but must have also acquired a PIN associated with the payment instrument. Techniques for acquiring PIN data include "PIN-on-glass" techniques where a PIN pad or other user interface is displayed on a merchant device configured to receive user input represent a PIN. Corresponding PIN data is generated on the merchant device and utilized for comparison with reference PIN data associated with the given payment instrument for completing a payment. Additionally, the techniques for acquiring PIN data include SPoC, where a secure reader PIN, a PIN application, the merchant device, as well as backend monitoring and attestation systems are utilized to acquire PIN data.

At block 1404, the process 1400 may include configuring the POS application to receive a PAN from the ECR. For example, the POS application may be configured to communicate with the NFC component of the mobile device to read and acquire PAN data from a payment instrument.

At block 1406, the process 1400 may include configuring a PIN application to receive a PIN utilizing a touchscreen, wherein the PIN application is configured to prevent communication with the POS application. For example, routines for acquiring PIN data via SPoC techniques may be enabled to allow the mobile device to communicate with a customer device and/or another device to receive a software PIN.

At block 1408, the process 1400 may include receiving, at the POS application, the PAN for a transaction. For example, an APDU command may initiate the process of causing a reader to acquire data from a payment instrument. The POS application may send an instance of the APDU command to the NFC component. Sending of the APDU command to the NFC component may cause the NFC component to initiate and/or to read PAN data from a payment instrument and/or to send read PAN data to one or more components of the merchant device.

At block 1410, the process 1400 may include requesting the PIN utilizing the touchscreen. For example, a PIN may be acquired and attestation and/or confirmatory operations may be performed by a server-side device and/or system. The process for acquiring a PIN may include, for example, the monitoring and/or management of platform security status, ensuring PIN security requirements, attestation procedures, and/or key management procedures.

At block 1412, the process 1400 may include receiving, at the PIN application, the PIN. For example, the PIN application may receive the PIN, such as from the customer device and/or the one or more other devices. In examples, the software PIN may be encrypted and the PIN application may be configured to decrypt the PIN.

At block 1414, the process 1400 may include completing the transaction based on receiving an indication that the account PIN is accepted in association with the PAN. For example, the payment processing service may provide an indication that the provided account PIN corresponds to an account PIN associated with the payment instrument and that the payment instrument is otherwise authorized to satisfy the payment.

Additionally, or alternatively, the process 1400 may include sending the PAN to a payment processing service. The process 1400 may also include removing the PAN from the device in response to sending the PAN to the payment processing service.

Additionally, or alternatively, the process 1400 may include receiving, from a payment processing service, a request for the account PIN. The process 1400 may also include removing the PAN from the device in response to receiving the request for the PIN.

Additionally, or alternatively, the process 1400 may include removing the PAN from the device, wherein requesting the account PIN is in response to removing the PAN from the device.

Additionally, or alternatively, the process 1400 may include causing, after receiving the PAN, a trust routine to be performed in association with the device, the trust routine configured to determine whether the device has been tampered with. The process 1400 may also include determining that the trust routine indicates the device has not been tampered with. In these examples, requesting the account PIN may be in response to the trust routine indicating the device has not been tampered with.

Additionally, or alternatively, the process 1400 may include receiving the PAN at a TEE of the device. The process 1400 may also include the account PIN being received outside the TEE of the device.

Additionally, or alternatively, the process 1400 may include, in response to requesting the account PIN, receiving an indication that user input is received that corresponds to the account PIN. In these examples, completing the payment may be based at least in part on the user input corresponding to the account PIN.

Additionally, or alternatively, the process 1400 may include receiving the PAN comprises receiving encrypted first data representing the PAN from the ECR. The process 1400 may also include receiving encrypted second data representing the account PIN.

Additionally, or alternatively, the process 1400 may include sending the encrypted data to a payment processing system. The process 1400 may also include receiving, from the payment processing system, an indication that the account PIN, as decrypted by the payment processing system, is authorized in association with the PAN. In these examples, completing the payment may be based at least in part on the account PIN being authorized in association with the PAN.

Additionally, or alternatively, the process 1400 may include removing, by the POS application, the PAN from the device before requesting the account PIN.

Figure 15:
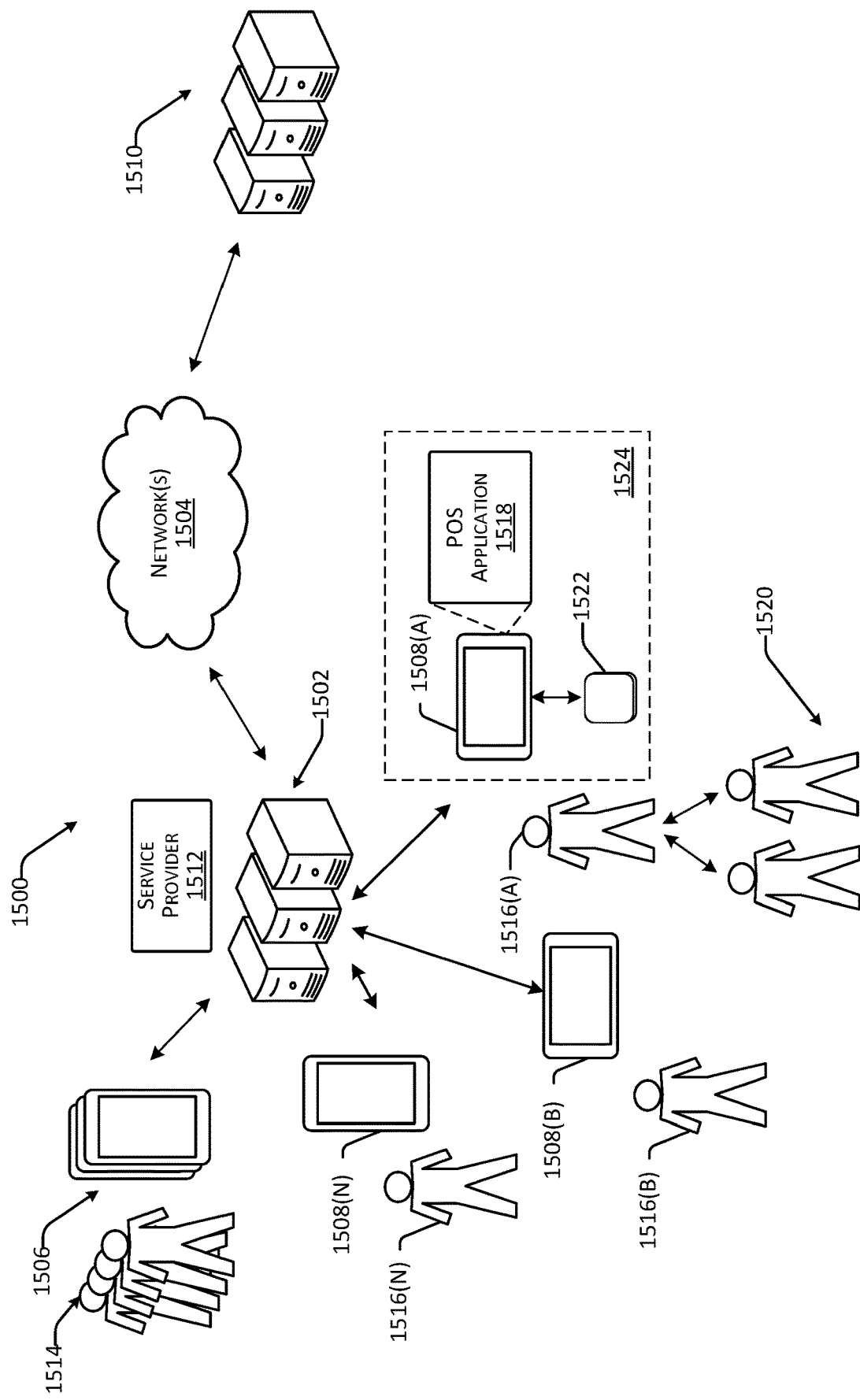
FIG. 15 illustrates an example merchant ecosystem for facilitating, among other things, techniques described herein.

FIG. 15 illustrates an example merchant ecosystem for facilitating, among other things, techniques described herein. The environment 1500 includes server computing device(s) 1502 that can communicate over a network 1504 with user devices 1506 (which, in some examples can be merchant devices 1508 (individually, 1508(A)-1508(N))) and/or server computing device(s) 1510 associated with third-party service provider(s). The server computing device(s) 1502 can be associated with a service provider 1512 that can provide one or more services for the benefit of users 1514, as described below. Actions attributed to the service provider 1512 can be performed by the server computing device(s) 1502.

In at least one example, the service provider 1512 can correspond to the payment processing service provider described above. In at least one example, the server computing device(s) 1502 can correspond to the server(s) 104 and the network(s) 1504 can correspond to the network(s) 108 described above with reference to FIG. 1A. In at least one example, the multimedia content service providers described above with reference to FIG. 1A can be associated with the server computing device(s) 1510 associated with third-party service provider(s).

The environment 1500 can facilitate the enhanced security measures associated with embedded card readers as described herein. As described above, techniques to spatial and/or temporally separate PAN data and PIN data on a consumer off-the-shelf device utilized for conducting payments may be employed utilizing the system 1500 described herein. For example, PAN data may be removed from the merchant device before a request for PIN data is made and/or before the PIN data is received at the device. Other methods include utilizing different applications to handle PAN data and PIN data, utilizing an intermediary application in addition to trust routines to determine whether a merchant device has been compromised, utilizing various encryption schemes, processing EMV data at a remote system, etc.

As described above, users of platforms (e.g., websites, applications, and other network-based communication tools provided by service providers) leverage tools for online commerce ("ecommerce"). However, current technology has limitations, as described above. In some examples, a nefarious actor that gains access to a merchant device, particularly a COTS device, may be able to gain access to both PAN data and PIN data. The environment 1500 described herein enables a more secure transaction environment while working within the confines of a typical transaction and without introducing undue latency to payment processing. Thus, techniques described herein offer improvements to existing technology.

The environment 1500 can include a plurality of user devices 1506, as described above. Each one of the plurality of user devices 1506 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1514. The users 1514 can be referred to as buyers, customers, sellers, merchants, borrowers, employees, employers, payors, payees, couriers and so on. The users 1514 can interact with the user devices 1506 via user interfaces presented via the user devices 1506. In at least one example, a user interface can be presented via a web browser, or the like. In other examples, a user interface can be presented via an application, such as a mobile application or desktop application, which can be provided by the service provider 1512 or which can be an otherwise dedicated application. In some examples, individual of the user devices 1506 can have an instance or versioned instance of an application, which can be downloaded from an application store, for example, which can present the user interface(s) described herein. In at least one example, a user 1514 can interact with the user interface via touch input, spoken input, or any other type of input.

In at least one example, the merchant device 102 and the other merchant devices 106 described above in FIG. 1 can comprise user devices 1506 as described herein. Similarly, the merchant and the buyer can comprise users 1514 as used herein.

In at least one example, the users 1514 can include merchants 1516 (individually, 1516(A)-1516(N)). In an example, the merchants 1516 can operate respective merchant devices 1508, which can be user devices 1506 configured for use by merchants 1516. For the purpose of this discussion, a "merchant" can be any entity that offers items (e.g., goods or services) for purchase or other means of acquisition (e.g., rent, borrow, barter, etc.). The merchants 1516 can offer items for purchase or other means of acquisition via brick-and-mortar stores, mobile stores (e.g., pop-up shops, food trucks, etc.), online stores, combinations of the foregoing, and so forth. In some examples, at least some of the merchants 1516 can be associated with a same entity but can have different merchant locations and/or can have franchise/franchisee relationships. In additional or alternative examples, the merchants 1516 can be different merchants. That is, in at least one example, the merchant 1516(A) is a different merchant than the merchant 1516(B) and/or the merchant 1516(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EINs), lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1508 can have an instance of a POS application 1518 stored thereon. The POS application 1518 can configure the merchant device 1508 as a POS terminal, which enables the merchant 1516(A) to interact with one or more buyers 1520. As described above, the users 1514 can include buyers, such as the buyers 1520 shown as interacting with the merchant 1516(A). For the purpose of this discussion, a "buyer" can be any entity that acquires items from merchants. While only two buyers 1520 are illustrated in FIG. 15, any number of buyers 1520 can interact with the merchants 1516. Further, while FIG. 15 illustrates the buyers 1520 interacting with the merchant 1516(A), the buyers 1520 can interact with any of the merchants 1516.

In at least one example, interactions between the buyers 1520 and the merchants 1516 that involve the exchange of funds (from the buyers 1520) for items (from the merchants 1516) can be referred to as "POS transactions" and/or "transactions." In at least one example, the POS application 1518 can determine transaction data associated with the POS transactions. Transaction data can include payment information, which can be obtained from a reader device 1522 associated with the merchant device 1508(A), user authentication data, purchase amount information, point-of-purchase information (e.g., item(s) purchased, date of purchase, time of purchase, etc.), etc. The POS application 1518 can send transaction data to the server computing device(s) 1502. Furthermore, the POS application 1518 can present a UI to enable the merchant 1516(A) to interact with the POS application 1518 and/or the service provider 1512 via the POS application 1518.

In at least one example, the merchant device 1508(A) can be a special-purpose computing device configured as a POS terminal (via the execution of the POS application 1518). In at least one example, the POS terminal may be connected to a reader device 1522, which is capable of accepting a variety of payment instruments, such as credit cards, debit cards, gift cards, short-range communication-based payment instruments, and the like, as described below. In at least one example, the reader device 1522 can plug in to a port in the merchant device 1508(A), such as a microphone port, a headphone port, an audio-jack, a data port, or other suitable port. In additional or alternative examples, the reader device 1522 can be coupled to the merchant device 1508(A) via another wired or wireless connection, such as via a Bluetooth®, BLE, and so on. Additional details are described below with reference to FIG. 16. In some examples, the reader device 1522 can read information from alternative payment instruments including, but not limited to, wristbands and the like.

In some examples, the reader device 1522 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1522, and communicate with the server computing device(s) 1502, which can provide, among other services, a payment processing service. The server computing device(s) 1502 associated with the service provider 1512 can communicate with server computing device(s) 1510, as described below. In this manner, the POS terminal and reader device 1522 may collectively process transaction(s) between the merchants 1516 and buyers 1520. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

In examples, the POS application(s) described herein may be configured to communicate with the reader device 1522 and/or the ECR, such as to receive PAN data from the reader device 1522 and/or the ECR. The card reader library and/or intermediary applications as described herein may be configured to assist in establishing and/or facilitating secure communications between the reader device 1522 and the POS application(s) and/or the ECR and the POS application(s).

While, the POS terminal and the reader device 1522 of the POS system 1524 are shown as separate devices, in additional or alternative examples, the POS terminal and the reader device 1522 can be part of a single device. In some examples, the reader device 1522 can have a display integrated therein for presenting information to the buyers 1520. In additional or alternative examples, the POS terminal can have a display integrated therein for presenting information to the buyers 1520. POS systems, such as the POS system 1524, may be mobile, such that POS terminals and reader devices may process transactions in disparate locations across the world. POS systems can be used for processing card-present transactions and card-not-present (CNP) transactions, as described below.

A card-present transaction is a transaction where both a buyer 1520 and his or her payment instrument are physically present at the time of the transaction. Card-present transactions may be processed by swipes, dips, taps, or any other interaction between a physical payment instrument (e.g., a card), or otherwise present payment instrument, and a reader device 1522 whereby the reader device 1522 is able to obtain payment data from the payment instrument. A swipe is a card-present transaction where a buyer 1520 slides a card, or other payment instrument, having a magnetic strip through a reader device 1522 that captures payment data contained in the magnetic strip. A dip is a card-present transaction where a buyer 1520 inserts a payment instrument having an embedded microchip (i.e., chip) into a reader device 1522 first. The dipped payment instrument remains in the payment reader until the reader device 1522 prompts the buyer 1520 to remove the card, or other payment instrument. While the payment instrument is in the reader device 1522, the microchip can create a one-time code which is sent from the POS system 1524 to the server computing device(s) 1510 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a buyer 1520 may tap or hover his or her payment instrument (e.g., card, electronic device such as a smart phone running a payment application, etc.) over a reader device 1522 to complete a transaction via short-range communication (e.g., NFC, RFID, Bluetooth®, BLE, etc.). Short-range communication enables the payment instrument to exchange information with the reader device 1522. A tap may also be called a contactless payment.

A CNP transaction is a transaction where a card, or other payment instrument, is not physically present at the POS such that payment data is required to be manually keyed in (e.g., by a merchant, buyer, etc.), or payment data is required to be recalled from a card-on-file data store, to complete the transaction.

The POS system 1524, the server computing device(s) 1502, and/or the server computing device(s) 1510 may exchange payment information and transaction data to determine whether transactions are authorized. For example, the POS system 1524 may provide encrypted payment data, user authentication data, purchase amount information, point-of-purchase information, etc. (collectively, transaction data) to server computing device(s) 1502 over the network(s) 1504. The server computing device(s) 1502 may send the transaction data to the server computing device(s) 1510. As described above, in at least one example, the server computing device(s) 1510 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1510 associated therewith) can send a fund transfer request to a server computing device of a card payment network (e.g., Mastercard®, VISA®, etc.) to determine whether the transaction is authorized or deficient. In at least one example, the service provider 1512 can serve as an acquirer and connect directly with the card payment network.

The card payment network (e.g., the server computing device(s) 1510 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1510 associated therewith) can make a determination as to whether the buyer has the capacity to absorb the relevant charge associated with the payment transaction. In at least one example, the service provider 1512 can serve as an issuer and/or can partner with an issuer. The transaction is either approved or rejected by the issuer and/or the card payment network (e.g., the server computing device(s) 1510 associated therewith), and a payment authorization message is communicated from the issuer to the POS device via a path opposite of that described above, or via an alternate path.

As described above, the server computing device(s) 1510, which can be associated with payment service provider(s), may determine whether the transaction is authorized based on the transaction data, as well as information relating to parties to the transaction (e.g., the buyer 1520 and/or the merchant 1516(A)). The server computing device(s) 1510 may send an authorization notification over the network(s) 1504 to the server computing device(s) 1502, which may send the authorization notification to the POS system 1524 over the network(s) 1504 to indicate whether the transaction is authorized. The server computing device(s) 1502 may also transmit additional information such as transaction identifiers to the POS system 1524. In one example, the server computing device(s) 1502 may include a merchant application and/or other functional components for communicating with the POS system 1524 and/or the server computing device(s) 1510 to authorize or decline transactions.

Based on the authentication notification that is received by the POS system 1524 from server computing device(s) 1502, the merchant 1516(A) may indicate to the buyer 1520 whether the transaction has been approved. In some examples, approval may be indicated at the POS system 1524, for example, at a display of the POS system 1524. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1512 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1514 can access all of the services of the service provider 1512. In other examples, the users 1514 can have gradated access to the services, which can be based on risk tolerance, IDV outputs, subscriptions, and so on. In at least one example, access to such services can be availed to the merchants 1516 via the POS application 1518. In additional or alternative examples, each service can be associated with its own access point (e.g., application, web browser, etc.).

The service provider 1512 can offer payment processing services for processing payments on behalf of the merchants 1516, as described above. For example, the service provider 1512 can provision payment processing software, payment processing hardware and/or payment processing services to merchants 1516, as described above, to enable the merchants 1516 to receive payments from the buyers 1520 when conducting POS transactions with the buyers 1520. For instance, the service provider 1512 can enable the merchants 1516 to receive cash payments, payment card payments, and/or electronic payments from buyers 1520 for POS transactions and the service provider 1512 can process transactions on behalf of the merchants 1516.

As the service provider 1512 processes transactions on behalf of the merchants 1516, the service provider 1512 can maintain accounts or balances for the merchants 1516 in one or more ledgers. For example, the service provider 1512 can analyze transaction data received for a transaction to determine an amount of funds owed to a merchant 1516(A) for the transaction. In at least one example, such an amount can be a total purchase price less fees charged by the service provider 1512 for providing the payment processing services. Based on determining the amount of funds owed to the merchant 1516(A), the service provider 1512 can deposit funds into an account of the merchant 1516(A). The account can have a stored balance, which can be managed by the service provider 1512. The account can be different from a conventional bank account at least because the stored balance is managed by a ledger of the service provider 1512 and the associated funds are accessible via various withdrawal channels including, but not limited to, scheduled deposit, same-day deposit, instant deposit, and a linked payment instrument.

A scheduled deposit can occur when the service provider 1512 transfers funds associated with a stored balance of the merchant 1516(A) to a bank account of the merchant 1516(A) that is held at a bank or other financial institution (e.g., associated with the server computing device(s) 1510). Scheduled deposits can occur at a prearranged time after a POS transaction is funded, which can be a business day after the POS transaction occurred, or sooner or later. In some examples, the merchant 1516(A) can access funds prior to a scheduled deposit. For instance, the merchant 1516(A) may have access to same-day deposits (e.g., wherein the service provider 1512 deposits funds from the stored balance to a linked bank account of the merchant on a same day as POS transaction, in some examples prior to the POS transaction being funded) or instant deposits (e.g., wherein the service provider 1512 deposits funds from the stored balance to a linked bank account of the merchant on demand, such as responsive to a request). Further, in at least one example, the merchant 1516(A) can have a payment instrument that is linked to the stored balance that enables the merchant to access the funds without first transferring the funds from the account managed by the service provider 1512 to the bank account of the merchant 1516(A).

In at least one example, the service provider 1512 may provide inventory management services. That is, the service provider 1512 may provide inventory tracking and reporting. Inventory management services may enable the merchant 1516(A) to access and manage a database storing data associated with a quantity of each item that the merchant 1516(A) has available (i.e., an inventory). Furthermore, in at least one example, the service provider 1512 can provide catalog management services to enable the merchant 1516(A) to maintain a catalog, which can be a database storing data associated with items that the merchant 1516(A) has available for acquisition (i.e., catalog management services). In at least one example, the catalog may include a plurality of data items and a data item of the plurality of data items may represent an item that the merchant 1561(A) has available for acquisition. The service provider 1512 can offer recommendations related to pricing of the items, placement of items on the catalog, and multi-party fulfilment of the inventory.

In at least one example, the service provider 1512 can provide business banking services, which allow the merchant 1516(A) to track deposits (from payment processing and/or other sources of funds) into an account of the merchant 1516(A), payroll payments from the account (e.g., payments to employees of the merchant 1516(A)), payments to other merchants (e.g., business-to-business) directly from the account or from a linked debit card, withdrawals made via scheduled deposit and/or instant deposit, etc. Furthermore, the business banking services can enable the merchant 1516(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1516 to visualize their cash flow to track their financial health, set aside money for upcoming obligations (e.g., savings), organize money around goals, etc.

In at least one example, the service provider 1512 can provide financing services and products, such as via business loans, consumer loans, fixed term loans, flexible term loans, and the like. In at least one example, the service provider 1512 can utilize one or more risk signals to determine whether to extend financing offers and/or terms associated with such financing offers.

In at least one example, the service provider 1512 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1512 can offer different types of capital loan products. For instance, in at least one example, the service provider 1512 can offer a daily repayment loan product, wherein a capital loan is repaid daily, for instance, from a portion of transactions processed by the payment processing service on behalf of the borrower. Additionally and/or alternatively, the service provider 1512 can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider 1512 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1516. The service provider 1512 can create the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 1512 (e.g., from payments owed to the merchant from payments processed on behalf of the merchant, funds transferred to the merchant, etc.). The service provider 1512 can offer specific financial products, such as payment instruments, tied specifically to the loan products. For example, in one implementation, the server provider 1512 associates capital to a merchant or buyer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1512 can provide web-development services, which enable users 1514 who are unfamiliar with HTML, XML, JavaScript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1516. In at least one example, the service provider 1512 can recommend and/or create content items to supplement omni-channel presences of the merchants 1516. That is, if a merchant of the merchants 1516 has a web page, the service provider 1512—via the web-development or other services—can recommend and/or create additional content items to be presented via other channel(s), such as social media, email, etc.

Furthermore, the service provider 1512 can provide payroll services to enable employers to pay employees for work performed on behalf of employers. In at least one example, the service provider 1512 can receive data that includes time worked by an employee (e.g., through imported timecards and/or POS interactions), sales made by the employee, gratuities received by the employee, and so forth. Based on such data, the service provider 1512 can make payroll payments to employee(s) on behalf of an employer via the payroll service. For instance, the service provider 1512 can facilitate the transfer of a total amount to be paid out for the payroll of an employee from the bank of the employer to the bank of the service provider 1512 to be used to make payroll payments. In at least one example, when the funds have been received at the bank of the service provider 1512, the service provider 1512 can pay the employee, such as by check or direct deposit, often a day, a week, or more after when the work was actually performed by the employee. In additional or alternative examples, the service provider 1512 can enable employee(s) to receive payments via same-day or instant deposit based at least in part on risk and/or reliability analyses performed by the service provider 1512.

Moreover, in at least one example, the service provider 1512 can provide employee management services for managing schedules of employees. Further, the service provider 1512 can provide appointment services for enabling users 1514 to set schedules for scheduling appointments and/or users 1514 to schedule appointments.

In some examples, the service provider 1512 can provide restaurant management services to enable users 1514 to make and/or manage reservations, to monitor front-of-house and/or back-of-house operations, and so on. In such examples, the merchant device(s) 1508 and/or server computing device(s) 1502 can be configured to communicate with one or more other computing devices, which can be located in the front-of-house (e.g., POS device(s)) and/or back-of-house (e.g., kitchen display system(s) (KDS)). In at least one example, the service provider 1512 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 1512 can provide fulfilment services, which can use couriers for delivery, wherein couriers can travel between multiple locations to provide delivery services, photography services, etc. Couriers can be users 1514 who can travel between locations to perform services for a requesting user 1514 (e.g., deliver items, capture images, etc.). In some examples, the courier can receive compensation from the service provider 1512. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1512 can receive requests for courier services, automatically assign the requests to active couriers, and communicate dispatch instructions to couriers via user interface (e.g., application, web browser, or other access point) presented via respective devices 1506.

In some examples, the service provider 1512 can provide omni-channel fulfillment services. For instance, if a buyer places an order with a merchant and the merchant cannot fulfill the order because one or more items are out of stock or otherwise unavailable, the service provider 1512 can leverage other merchants and/or sales channels that are part of the platform of the service provider 1512 to fulfill the buyer's order. That is, another merchant can provide the one or more items to fulfill the order of the buyer. Furthermore, in some examples, another sales channel (e.g., online, brick-and-mortar, etc.) can be used to fulfill the order of the buyer.

In some examples, the service provider 1512 can enable conversational commerce via conversational commerce services, which can use one or more machine learning mechanisms to analyze messages exchanged between two or more users 1514, voice inputs into a virtual assistant or the like, to determine intents of user(s) 1514. In some examples, the service provider 1512 can utilize determined intents to automate buyer service, offer promotions, provide recommendations, or otherwise interact with buyers in real-time. In at least one example, the service provider 1512 can integrate products and services, and payment mechanisms into a communication platform (e.g., messaging, etc.) to enable buyers to make purchases, or otherwise transact, without having to call, email, or visit a web page or other channel of a merchant. That is, conversational commerce alleviates the need for buyers to toggle back and forth between conversations and web pages to gather information and make purchases.

In at least one example, the service provider 1512 can provide a peer-to-peer payment service that enables peer-to-peer payments between two or more users 1514. In at least one example, the service provider 1512 can communicate with instances of a payment application (or other access point) installed on devices 1506 configured for operation by users 1514. In an example, an instance of the payment application executing on a first device operated by a payor can send a request to the service provider 1512 to transfer an amount of funds (e.g., fiat currency or non-fiat currency such as cryptocurrency, securities, and related assets) from an account of the payor to an account of a payee (e.g., a peer-to-peer payment). The service provider 1512 can facilitate the transfer and can send a notification to an instance of the payment application executing on a second mobile device operated by the payee that the transfer is in process (or has been completed). In some examples, the service provider 1512 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1512 funds the request to payee on behalf of the payor, to speed up the transfer process and compensate for any lags that may be attributed to payor's financial network.

In some implementations, the service provider 1512 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (E), rupee (Z), yuan (v), etc. Although use of the dollar currency indicator ($) is used herein, it is to be understood that any currency symbol could equally be used. The peer-to-peer process can be initiated through a particular application executing on the user devices 1506.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1512. For instance, the service provider 1512 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1506 (e.g., mobile device or conventional personal computer (PC)) based on instructions transmitted to and from the server computing device(s) 1502 (which, in such an example can be called a "messaging server"). In some instances, the messaging application can include a payment application with messaging capability that enables users of the payment application to communicate with one another. In such instances, the payment application can be executed on the user device 1506 based on instructions transmitted to and from the server computing device(s) 1502 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1512 can create the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1514 may be new to the service provider 1512 such that the user 1514 that has not registered (e.g., subscribed to receive access to one or more services offered by the service provider) with the service provider 1512. The service provider 1512 can offer onboarding services for registering a potential user 1514 with the service provider 1512. In some examples, onboarding can involve presenting various questions, prompts, and the like to a potential user 1514 to obtain information that can be used to create a profile for the potential user 1514. In at least one example, the service provider 1512 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1514 providing all necessary information, the potential user 1514 can be onboarded to the service provider 1512. In such an example, any limited or short-term access to services of the service provider 1512 can be transitioned to more permissive (e.g., less limited) or longer-term access to such services.

The service provider 1512 can be associated with IDV services, which can be used by the service provider 1512 for compliance purposes and/or can be offered as a service, for instance to third-party service providers (e.g., associated with the server computing device(s) 1510). That is, the service provider 1512 can offer IDV services to verify the identity of users 1514 seeking to use or using their services. Identity verification requires a buyer (or potential buyer) to provide information that is used by compliance departments to prove that the information is associated with an identity of a real person or entity. In at least one example, the service provider 1512 can perform services for determining whether identifying information provided by a user 1514 accurately identifies the buyer (or potential buyer) (i.e., Is the buyer who they say they are?).

The service provider 1512 is capable of providing additional or alternative services and the services described above are offered as a sampling of services. In at least one example, the service provider 1512 can exchange data with the server computing device(s) 1510 associated with third-party service providers. Such third-party service providers can provide information that enables the service provider 1512 to provide services, such as those described above. In additional or alternative examples, such third-party service providers can access services of the service provider 1512. That is, in some examples, the third-party service providers can be subscribers, or otherwise access, services of the service provider 1512.

Techniques described herein can be configured to operate in both real-time/online and offline modes. "Online" modes refer to modes when devices are capable of communicating with the service provider 1512 (e.g., the server computing device(s) 1502) and/or the server computing device(s) 1510 via the network(s) 1504. In some examples, the merchant device(s) 1508 are not capable of connecting with the service provider 1512 (e.g., the server computing device(s) 1502) and/or the server computing device(s) 1510, due to a network connectivity issue, for example. In additional or alternative examples, the server computing device(s) 1502 are not capable of communicating with the server computing device(s) 1510 due to network connectivity issue, for example. In such examples, devices may operate in "offline" mode where at least some payment data is stored (e.g., on the merchant device(s) 1508) and/or the server computing device(s) 1502 until connectivity is restored and the payment data can be transmitted to the server computing device(s) 1502 and/or the server computing device(s) 1510 for processing.

In at least one example, the service provider 1512 can be associated with a hub, such as an order hub, an inventory hub, a fulfillment hub and so on, which can enable integration with one or more additional service providers (e.g., associated with the additional server computing device(s) 1510). In some examples, such additional service providers can offer additional or alternative services and the service provider 1512 can provide an interface or other computer-readable instructions to integrate functionality of the service provider 1512 into the one or more additional service providers.

Techniques described herein are directed to services provided via a distributed system of user devices 1506 that are in communication with one or more server computing devices 1502 of the service provider 1512. That is, techniques described herein are directed to a specific implementation—or, a practical application—of utilizing a distributed system of user devices 1506 that are in communication with one or more server computing devices 1502 of the service provider 1512 to perform a variety of services, as described above. The unconventional configuration of the distributed system described herein enables the server computing device(s) 1502 that are remotely-located from end-users (e.g., users 1514) to intelligently offer services based on aggregated data associated with the end-users, such as the users 1514 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 1512, and those outside of the control of the service provider 1512, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1514 and user devices 1506. Furthermore, such features are changed dynamically based on the profiles of the users involved interacting with the GUIs. As such, techniques described herein are directed to improvements to computing systems.

Figure 16:
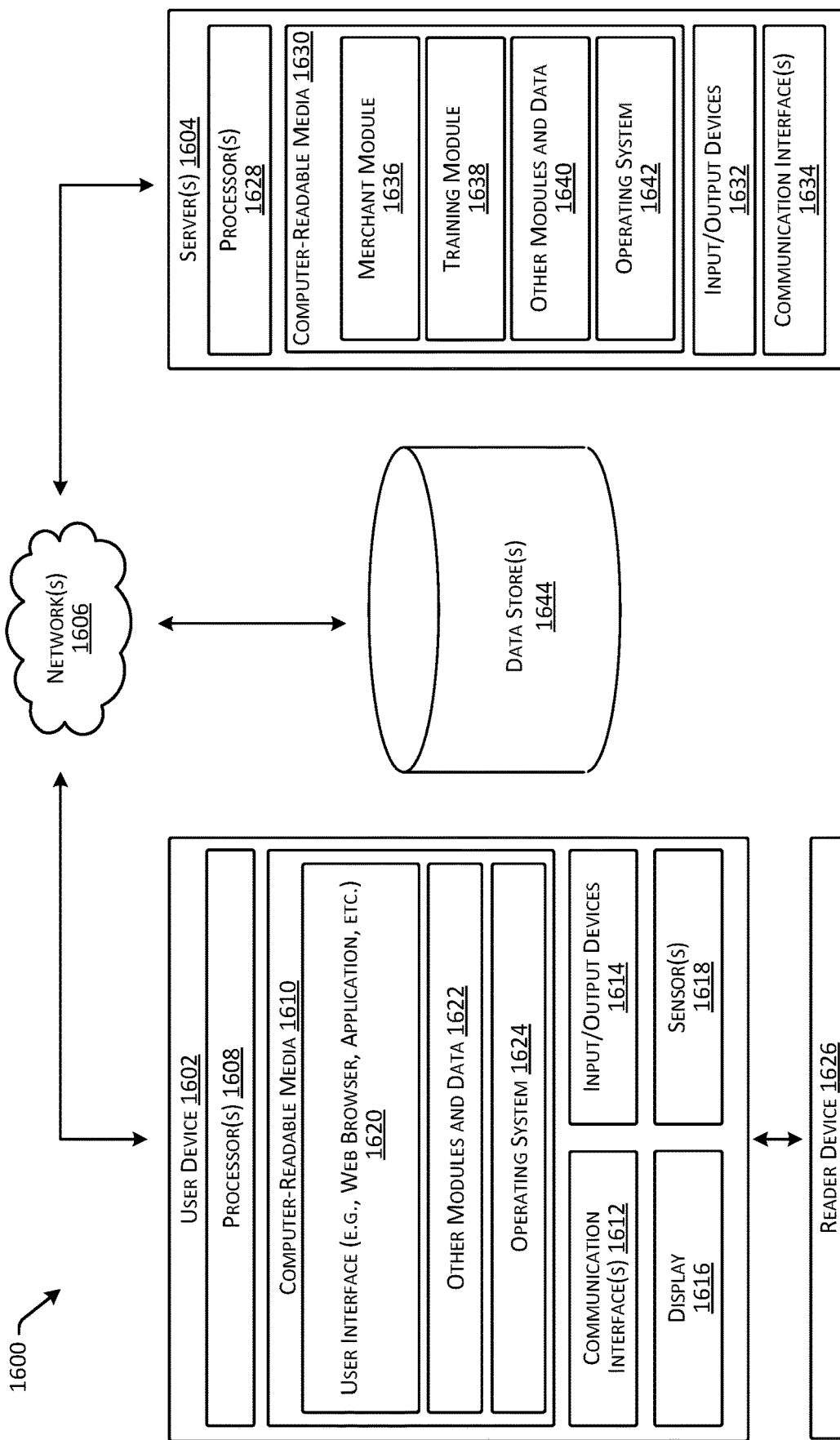
FIG. 16 illustrates additional details associated with individual components of the merchant ecosystem described in FIG. 15.

FIG. 16 illustrates additional details associated with individual components of the merchant ecosystem described in FIG. 15. The system 1600 includes a user device 1602, that communicates with server computing device(s) (e.g., server(s) 1604) via network(s) 1606 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1602 is illustrated, in additional or alternate examples, the system 1600 can have multiple user devices, as described above with reference to FIG. 15.

The environment 1600 can facilitate the enhanced security measures associated with embedded card readers as described herein. As described above, techniques to spatial and/or temporally separate PAN data and PIN data on a consumer off-the-shelf device utilized for conducting payments may be employed utilizing the system 1600 described herein. For example, PAN data may be removed from the merchant device before a request for PIN data is made and/or before the PIN data is received at the device. Other methods include utilizing different applications to handle PAN data and PIN data, utilizing an intermediary application in addition to trust routines to determine whether a merchant device has been compromised, utilizing various encryption schemes, processing EMV data at a remote system, etc.

As described above, users of platforms (e.g., websites, applications, and other network-based communication tools provided by service providers) leverage tools for online commerce ("ecommerce"). However, current technology has limitations, as described above. In some examples, a user interested in selling products can start selling products in a given unit of measurement. Such systems do not provide insight on what the best units of measurement may be for purchasing, storing, and/or selling product in. Furthermore, the current infrastructure does not allow automatic filtering of transaction data associated with units of measurement and puts the onus on the merchant to gather and decipher this information. As such, current technology is inefficient and is not user friendly. The environment 1600 described herein enables frictionless (or near-frictionless) unit conversion recommendations via interactions between merchants and merchant devices. Thus, techniques described herein offer improvements to existing technology.

In at least one example, the user device 1602 can be any suitable type of computing device, e.g., portable, semi-portable, semi-stationary, or stationary. Some examples of the user device 1602 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1602 can be any computing device capable of sending communications and performing the functions according to the techniques described herein. The user device 1602 can include devices, e.g., payment card readers, or components capable of accepting payments, as described below.

In the illustrated example, the user device 1602 includes one or more processors 1608, one or more computer-readable media 1610, one or more communication interface (s) 1612, one or more input/output (I/O) devices 1614, a display 1616, and sensor(s) 1618.

In at least one example, each processor 1608 can itself comprise one or more processors or processing cores. For example, the processor(s) 1608 can be implemented as one or more microprocessors, microcomputers, microcontrollers, digital signal processors, central processing units, state machines, logic circuitries, and/or any devices that manipulate signals based on operational instructions. In some examples, the processor(s) 1608 can be one or more hardware processors and/or logic circuits of any suitable type specifically programmed or configured to execute the algorithms and processes described herein. The processor(s) 1608 can be configured to fetch and execute computer-readable processor-executable instructions stored in the computer-readable media 1610.

Depending on the configuration of the user device 1602, the computer-readable media 1610 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1610 can include, but is not limited to, RAM, ROM, EEPROM, flash memory, solid-state storage, magnetic disk storage, optical storage, and/or other computer-readable media technology. Further, in some examples, the user device 1602 can access external storage, such as RAID storage systems, storage arrays, network attached storage, storage area networks, cloud storage, or any other medium that can be used to store information and that can be accessed by the processor(s) 1608 directly or through another computing device or network. Accordingly, the computer-readable media 1610 can be computer storage media able to store instructions, modules or components that can be executed by the processor(s) 1608. Further, when mentioned, non-transitory computer-readable media exclude media such as energy, carrier signals, electromagnetic waves, and signals per se.

The computer-readable media 1610 can be used to store and maintain any number of functional components that are executable by the processor(s) 1608. In some implementations, these functional components comprise instructions or programs that are executable by the processor(s) 1608 and that, when executed, implement operational logic for performing the actions and services attributed above to the user device 1602. Functional components stored in the computer-readable media 1610 can include a user interface 1620 to enable users to interact with the user device 1602, and thus the server(s) 1604 and/or other networked devices. In at least one example, the user interface 1620 can be presented via a web browser, or the like. In other examples, the user interface 1620 can be presented via an application, such as a mobile application or desktop application, which can be provided by a service provider 1612 associated with the server(s) 1604, or which can be an otherwise dedicated application. In some examples, the user interface 1620 can be one of the user interface(s) described above with reference to FIG. 1A. In at least one example, a user can interact with the user interface via touch input, spoken input, gesture, or any other type of input. The word "input" is also used to describe "contextual" input that may not be directly provided by the user via the user interface 1620. For example, user's interactions with the user interface 1620 are analyzed using, e.g., natural language processing techniques, to determine context or intent of the user, which may be treated in a manner similar to "direct" user input.

Depending on the type of the user device 1602, the computer-readable media 1610 can also optionally include other functional components and data, such as other modules and data 1622, which can include programs, drivers, etc., and the data used or created by the functional components. In addition, the computer-readable media 1610 can also store data, data structures and the like, that are used by the functional components. Further, the user device 1602 can include many other logical, programmatic and physical components, of which those described are merely examples that are related to the discussion herein.

In at least one example, the computer-readable media 1610 can include additional functional components, such as an operating system 1624 for controlling and managing various functions of the user device 1602 and for enabling basic user interactions.

The communication interface(s) 1612 can include one or more interfaces and hardware components for enabling communication with various other devices, such as over the network(s) 1606 or directly. For example, communication interface(s) 1612 can enable communication through one or more network(s) 1606, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1606 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1602 can further include one or more input/output (I/O) devices 1614. The I/O devices 1614 can include speakers, a microphone, a camera, and various user controls (e.g., buttons, a joystick, a keyboard, a keypad, etc.), a haptic output device, and so forth. The I/O devices 1614 can also include attachments that leverage the accessories (audio-jack, USB-C, Bluetooth, etc.) to connect with the user device 1602.

In at least one example, user device 1602 can include a display 1616. Depending on the type of computing device(s) used as the user device 1602, the display 1616 can employ any suitable display technology. For example, the display 1616 can be a liquid crystal display, a plasma display, a light emitting diode display, an OLED (organic light-emitting diode) display, an electronic paper display, or any other suitable type of display able to present digital content thereon. In at least one example, the display 1616 can be an augmented reality display, a virtually reality display, or any other display able to present and/or project digital content. In some examples, the display 1616 can have a touch sensor associated with the display 1616 to provide a touchscreen display configured to receive touch inputs for enabling interaction with a graphic interface presented on the display 1616. Accordingly, implementations herein are not limited to any particular display technology. Alternatively, in some examples, the user device 1602 may not include the display 1616, and information can be presented by other means, such as aurally, haptically, etc.

In addition, the user device 1602 can include sensor(s) 1618. The sensor(s) 1618 can include a GPS device able to indicate location information. Further, the sensor(s) 1618 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1412, described above, to provide one or more services. That is, in some examples, the service provider 1412 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1414 and/or for sending users 1414 notifications regarding available appointments with merchant(s) located proximate to the users 1414. In at least one example, location can be used for taking payments from nearby buyers when they leave a geofence, or location can be used to initiate an action responsive to users 1414 enter a brick-and-mortar store of a merchant. Location can be used in additional or alternative ways as well.

Additionally, the user device 1602 can include various other components that are not shown, examples of which include removable storage, a power source, such as a battery and power control unit, a barcode scanner, a printer, a cash drawer, and so forth.

In addition, in some examples, the user device 1602 can include, be connectable to, or otherwise be coupled to a reader device 1626, for reading payment instruments and/or identifiers associated with payment objects. In some examples, as described above, the reader device 1626 can plug in to a port in the user device 1602, such as a microphone port, a headphone port, an audio-jack, a data port, or other suitable port. In additional or alternative examples, the reader device 1626 can be coupled to the user device 1602 via another wired or wireless connection, such as via a Bluetooth®, BLE, and so on. The reader device 1626 can include a read head for reading a magnetic strip of a payment card, and further can include encryption technology for encrypting the information read from the magnetic strip. Additionally or alternatively, the reader device 1626 can be an EMV payment reader, which in some examples, can be embedded in the user device 1602. Moreover, numerous other types of readers can be employed with the user device 1602 herein, depending on the type and configuration of the user device 1602.

The reader device 1626 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1626 may include hardware implementation, such as slots, magnetic tracks, and rails with one or more sensors or electrical contacts to facilitate detection and acceptance of a payment instrument. That is, the reader device 1626 may include hardware implementations to enable the reader device 1626 to interact with a payment instrument via a swipe (i.e., a card-present transaction where a buyer slides a card having a magnetic strip through a payment reader that captures payment data contained in the magnetic strip), a dip (i.e., a card-present transaction where a buyer inserts a card having an embedded microchip (i.e., chip) into a payment reader first until the payment reader prompts the buyer to remove the card), or a tap (i.e., a card-present transaction where a buyer may tap or hover his or her electronic device such as a smart phone running a payment application over a payment reader to complete a transaction via short-range communication) to obtain payment data associated with a buyer. Additionally or optionally, the reader device 1626 may also include a biometric sensor to receive and process biometric characteristics and process them as payment instruments, given that such biometric characteristics are registered with the payment processing service provider and connected to a financial account with a bank server. It should be understood that the reader device may be an ECR.

The reader device 1626 may include processing unit(s), computer-readable media, a reader chip, a transaction chip, a timer, a clock, a network interface, a power supply, and so on. The processing unit(s) of the reader device 1626 may execute one or more modules and/or processes to cause the reader device 1626 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1626, the computer-readable media may include volatile memory (such as RAM), non-volatile memory (such as ROM, flash memory, miniature hard drive, memory card, or the like), or some combination thereof. In at least one example, the computer-readable media of the reader device 1626 may include at least one module for performing various functions as described herein.

The reader chip may perform functionalities to control the operations and processing of the reader device 1626. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control a clock, which may provide a clock signal indicating a time. Furthermore, the reader chip may perform functionality to control the network interface, which may interface with the network(s) 1606, as described below.

Additionally, the reader chip may perform functionality to control the power supply. The power supply may include one or more power supplies such as a physical connection to AC power or a battery. Power supply may include power conversion circuitry for converting AC power and creating a plurality of DC voltages for use by components of reader device 1626. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the buyer, an address of the buyer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the buyer (which may or may not match the number associated with the payment instrument), restrictions on what types of charges/debts may be made, etc.

Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1602, which can be a POS terminal, and the reader device 1626 are shown as separate devices, in additional or alternative examples, the user device 1602 and the reader device 1626 can be part of a single device, which may be a battery-operated device. In such an example, components of both the user device 1602 and the reader device 1626 may be associated with the single device. In some examples, the reader device 1626 can have a display integrated therewith, which can be in addition to (or as an alternative of) the display 1616 associated with the user device 1602.

The server(s) 1604 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1604 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1604 can be located together or separately, and organized, for example, as virtual servers, server banks and/or server farms. The described functionality can be provided by the servers of a single merchant or enterprise or can be provided by the servers and/or services of multiple different buyers or enterprises.

In the illustrated example, the server(s) 1604 can include one or more processors 1628, one or more computer-readable media 1630, one or more I/O devices 1632, and one or more communication interfaces 1634. Each processor 1628 can be a single processing unit or a number of processing units and can include single or multiple computing units or multiple processing cores. The processor(s) 1628 can be implemented as one or more microprocessors, microcomputers, microcontrollers, digital signal processors, central processing units, state machines, logic circuitries, and/or any devices that manipulate signals based on operational instructions. For example, the processor(s) 1628 can be one or more hardware processors and/or logic circuits of any suitable type specifically programmed or configured to execute the algorithms and processes described herein. The processor(s) 1628 can be configured to fetch and execute computer-readable instructions stored in the computer-readable media 1630, which can program the processor(s) 1628 to perform the functions described herein.

The computer-readable media 1630 can include volatile and nonvolatile memory and/or removable and non-removable media implemented in any type of technology for storage of information, such as computer-readable instructions, data structures, program modules, or other data. Such computer-readable media 1630 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1604, the computer-readable media 1630 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1630 can be used to store any number of functional components that are executable by the processor(s) 1628. In many implementations, these functional components comprise instructions or programs that are executable by the processors 1628 and that, when executed, specifically configure the one or more processors 1628 to perform the actions attributed above to the service provider 1612 and/or payment processing service. Functional components stored in the computer-readable media 1630 can optionally include a merchant module 1636, a training module 1638, and one or more other modules and data 1640.

The merchant module 1636 can be configured to receive transaction data from POS systems, such as the POS system 1524 described above with reference to FIG. 15. The merchant module 1636 can transmit requests (e.g., authorization, capture, settlement, etc.) to payment service server computing device(s) to facilitate POS transactions between merchants and buyers. The merchant module 1636 can communicate the successes or failures of the POS transactions to the POS systems. The payment processing module 116 described above with reference to FIG. 1 can correspond to the merchant module 1636.

The training module 1638 can be configured to train models using machine-learning mechanisms. For example, a machine-learning mechanism can analyze training data to train a data model that creates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a data store(s) associated with the user device(s) 1602 and/or the server(s) 1604 for use at a time after the data models have been trained (e.g., at runtime).

The one or more other modules and data 1640 can include the interactive-element generator 138 and/or the command generator 140, the functionality of which is described, at least partially, above. Further, the one or more other modules and data 1640 can include programs, drivers, etc., and the data used or created by the functional components. Further, the server(s) 1604 can include many other logical, programmatic and physical components, of which those described above are merely examples that are related to the discussion herein.

The one or more "modules" and/or "components" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may create useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional and/or alternative examples, the module(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa. The API(s) 148, described above, can correspond to such.

The computer-readable media 1630 can additionally include an operating system 1642 for controlling and managing various functions of the server(s) 1604.

The communication interface(s) 1634 can include one or more interfaces and hardware components for enabling communication with various other devices, such as over the network(s) 1606 or directly. For example, communication interface(s) 1634 can enable communication through one or more network(s) 1606, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1602 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1604 can further be equipped with various I/O devices 1632. Such I/O devices 1632 can include a display, various user interface controls (e.g., buttons, joystick, keyboard, mouse, touch screen, biometric or sensory input devices, etc.), audio speakers, connection ports and so forth.

In at least one example, the system 1600 can include data store(s) 1644 that can be configured to store data that is accessible, manageable, and updatable. In some examples, the data store(s) 1644 can be integrated with the user device 1602 and/or the server(s) 1604. In other examples, as shown in FIG. 16, the data store(s) 1644 can be located remotely from the server(s) 1604 and can be accessible to the server(s) 1604. The data store(s) 1644 can comprise multiple databases and/or servers connected locally and/or remotely via the network(s) 1606. The data store(s) 146, described above with reference to FIG. 1A, can correspond to the data store(s) 1644.

In at least one example, the data store(s) 1644 can store user profiles, which can include merchant profiles, buyer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, buyer service data, etc. The merchant profile can securely store bank account information as provided by the merchant. Further, the merchant profile can store payment information associated with a payment instrument linked to a stored balance of the merchant, such as a stored balance maintained in a ledger by the service provider 1412.

Buyer profiles can store buyer data including, but not limited to, buyer information (e.g., name, phone number, address, banking information, etc.), buyer preferences (e.g., learned or buyer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, buyer service data, etc.

In at least one example, the account(s), described above with reference to FIG. 1, can include or be associated with the merchant profiles and/or buyer profiles described above.

Furthermore, in at least one example, the data store(s) 1644 can store inventory database(s) and/or catalog database(s). As described above, an inventory can store data associated with a quantity of each item that a merchant has available to the merchant. The records described above can be stored in the inventory data store. Furthermore, a catalog can store data associated with items that a merchant has available for acquisition. The data store(s) 1644 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 11-14 for convenience and ease of understanding. However, the methods illustrated are not limited to being performed using components described in FIGS. 1A-10, 15, and 16, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A device, comprising:
one or more processors; and
non-transitory computer-readable media storing instructions that, when executed by the one or more processors, cause the one or more processors to perform operations comprising:
configuring a personal account number (PAN) application installed on the device to utilize an embedded card reader (ECR) of the device, wherein the PAN application is configured within a trusted execution environment (TEE) of the device, and wherein components within the TEE are isolated from components outside the TEE;
receiving, at the PAN application and based at least in part on an interaction between the ECR and the device, a PAN for a transaction;
sending, utilizing the PAN application, the PAN to a payment processing service;
in response to determining that the PAN has been received at the payment processing service, causing a personal identification number (PIN) application residing on the device to render a PIN user interface, wherein the PIN application is configured outside the TEE of the device, preventing communication between the PIN application and the PAN application;
receiving, at the PIN application and utilizing the PIN user interface, a PIN;
sending, utilizing the PIN application, the PIN to the payment processing service; and
completing the transaction based at least in part on an indication from the payment processing service that the PAN and the PIN have been accepted.

2. The device of claim 1, the operations further comprising removing the PAN from the device in response to sending the PAN to the payment processing service.

3. The device of claim 1, the operations further comprising:
receiving, from the payment processing service, a request for the PIN; and
removing the PAN from the device in response to receiving the request for the PIN.

4. The device of claim 1, the operations further comprising removing the PAN from the device, wherein requesting the PIN is in response to removing the PAN from the device.

5. The device of claim 1, the operations further comprising:
causing, after receiving the PAN, a trust routine to be performed in association with the device, the trust routine configured to determine whether the device has been tampered with;

determining that the trust routine indicates the device has not been tampered with; and wherein requesting the PIN is in response to the trust routine indicating the device has not been tampered with.

6. The device of claim 1, the operations further comprising:

in response to requesting the PIN, receiving an indication that user input is received that corresponds to the PIN; and wherein completing the transaction is based at least in part on the user input corresponding to the PIN.

7. The device of claim 1, wherein:

receiving the PAN comprises receiving encrypted first data representing the PAN from the ECR at the PAN application; and receiving the PIN comprises receiving encrypted second data representing the PIN at the PIN application.

8. The device of claim 1, wherein receiving the PIN comprises receiving encrypted data representing the PIN at the PIN application, and the operations further comprise:

sending the encrypted data to the payment processing service;

receiving, from the payment processing service, an indication that the PIN, as decrypted by the payment processing service, is authorized in association with the PAN; and wherein completing the transaction is based at least in part on the PIN being authorized in association with the PAN.

9. The device of claim 1, the operations further comprising removing, by the PAN application, the PAN from the device before requesting the PIN.

10. The device of claim 1, wherein sending the PAN to the payment processing service further comprises sending a default PIN associated with the payment processing service.

11. A method, comprising:

configuring a personal account number (PAN) application installed on a device to utilize an embedded card reader (ECR) of the device, wherein the PAN application is configured within a trusted execution environment (TEE) of the device, and wherein components within the TEE are isolated from components outside the TEE;

receiving, at the PAN application and based at least in part on an interaction between the ECR and the device, a PAN for a transaction;

sending, utilizing the PAN application, the PAN to a payment processing service;

in response to determining that the PAN has been received at the payment processing service, causing a personal identification number (PIN) application residing on the device to render a PIN user interface, wherein the PIN application is configured outside the TEE of the device, preventing communication between the PIN application and the PAN application;

receiving, at the PIN application and utilizing the PIN user interface, a PIN;

sending, utilizing the PIN application, the PIN to the payment processing service; and completing the transaction based at least in part on an indication from the payment processing service that the PAN and the PIN have been accepted.

12. The method of claim 11, further comprising removing the PAN from the device in response to sending the PAN to the payment processing service.

13. The method of claim 11, further comprising:

receiving, from the payment processing service, a request for the PIN; and removing the PAN from the device in response to receiving the request for the PIN.

14. The method of claim 11, further comprising removing the PAN from the device, wherein requesting the PIN is in response to removing the PAN from the device.

15. The method of claim 11, further comprising:

causing, after receiving the PAN, a trust routine to be performed in association with the device, the trust routine configured to determine whether the device has been tampered with;

determining that the trust routine indicates the device has not been tampered with; and wherein requesting the PIN is in response to the trust routine indicating the device has not been tampered with.

16. The method of claim 11, further comprising:

in response to requesting the PIN, receiving an indication that user input is received that corresponds to the PIN; and wherein completing the transaction is based at least in part on the user input corresponding to the PIN.

17. The method of claim 11, wherein:

receiving the PAN comprises receiving encrypted first data representing the PAN from the ECR at the PAN application; and receiving the PIN comprises receiving encrypted second data representing the PIN at the PIN application.

18. The method of claim 11, wherein receiving the PIN comprises receiving encrypted data representing the PIN at the PIN application, and the method further comprises:

sending the encrypted data to the payment processing service;

receiving, from the payment processing service, an indication that the PIN, as decrypted by the payment processing service, is authorized in association with the PAN; and wherein completing the transaction is based at least in part on the PIN being authorized in association with the PAN.

19. The method of claim 11, further comprising removing, by the PAN application, the PAN from the device before requesting the PIN.

20. The method of claim 11, wherein sending the PAN to the payment processing further comprises sending a default PIN associated with the payment processing service.

* * * * *